United States Patent
Bovik et al.

(10) Patent No.: US 8,164,039 B2
(45) Date of Patent: Apr. 24, 2012

(54) METHOD AND APPARATUS FOR DETECTING SPICULATED MASSES IN MAMMOGRAPHY

(75) Inventors: Alan C. Bovik, Austin, TX (US); Mia K. Markey, Austin, TX (US); Mehul Sampat, Sunnyvale, CA (US)

(73) Assignee: Board of Regents, The University of Texas System, Austin, TX (US)

( * ) Notice: Subject to any disclaimer, the term of this patent is extended or adjusted under 35 U.S.C. 154(b) by 448 days.

(21) Appl. No.: 12/433,883

(22) Filed: Apr. 30, 2009

(65) Prior Publication Data

US 2010/0104148 A1 Apr. 29, 2010

Related U.S. Application Data

(60) Provisional application No. 61/049,326, filed on Apr. 30, 2008.

(51) Int. Cl.
*H01L 27/00* (2006.01)
(52) U.S. Cl. .................. 250/208.1; 250/214 R
(58) Field of Classification Search ............... 250/208.1, 250/214 R, 363.02–363.05; 382/128–159, 382/203, 264; 345/419
See application file for complete search history.

(56) References Cited

U.S. PATENT DOCUMENTS 5,799,100 A * 8/1998 Clarke et al. ................. 382/132

OTHER PUBLICATIONS

Yang, Changjiang, et al., "Improved Fast Gauss Transform and Efficient Kernel Density Estimation," IEEE, (2003), 8 pages.
Yang, Sang Kyu, et al., "Screening Mammography—Detected Cancers: Sensitivity of a Computer-Aioded Detection System Applied to Full-Field Digital Mammograms," Radiology, vol. 244, No. 1, Jul. 2007, pp. 104-111.
Zhang, M., et al., "Mammographic Texture Analysis for the Detection of Spiculated Lesions," (1996), Digital Mammography, pp. 347-.
Zwiggelaar, et al., "Model-Based Detection of Spiculated Lesions in Mammograms," Medical Image Analysis 3 (1), 39 (1999).
Zwiggelaar, et al., "Linear Structures in Mammographic Images: Detection and Classification," IEEE Transactions on Medical Imaging, 23 (9), 1077 (2004).
American College of Radiology, "ACR BI-RADS®—Mammography, Ultrasound & Magnetic Resonance Imaging," Fourth Ed, American College of Radiology, Reston, VA 2003).

(Continued)

*Primary Examiner* — Que T Le
(74) *Attorney, Agent, or Firm* — Daniel J. Chalker; Edwin S. Flores; Chalker Flores, LLP

(57) ABSTRACT

A method and apparatus detects one or more spiculated masses in an image using a processor. The image is received in the processor. The received image is filtered using one or more Gaussian filters to detect one or more central mass regions. The received image is also filtered using one or more spiculated lesion filters to detect where the one or more spiculated masses converge. In addition, the received image is filtered using one or more Difference-of-Gaussian filters to suppress one or more linear structures. An enhanced image showing the detected spiculated masses is created by combining an output from all of the filtering steps. The enhanced image is then provided to an output of the processor.

20 Claims, 12 Drawing Sheets

OTHER PUBLICATIONS

Averbuch, A., et al., "Fast Slant Stack: A Notion of Radon Transform for Data in a Cartesian Grid which is Rapidly Computible, Algebraically Exact, Geometrically Faithful and Invertible," SIAM Scientific Computing, 40 pages.

Bazzocchi, M., et al., "CAD systems for mammography: a real opportunity? A review of the literature," Radiol Med (Torino) 112 (3), 329 (2007).

Birdwell, R.L., et al., "Mammographic characteristics of 115 missed cancers later detected with screening mammography and the potential utility of computer-aided detection," Radiology 219 (1), 192 (2001).

Bovik, A. C., et al., "Multichannel texture analysis using localized spatial filters," IEEE Transactions on Pattern Analysis and Machine Intelligence 12 (1), 55 (1990).

Bovik, A. C., "Analysis of multichannel narrow-band filters for image texture segmentation," IEEE Transactions on Signal Processing 39 (9), 2025 (1991).

Bovik, A. C., et al., "Localized measurement of emergent 715 image frequencies by Gabor wavelets," IEEE Transactions on Information Theory 38 (2), 691 (1992).

Brem, R.F., et al., "Evaluation of breast cancer with a computer-aided detection system by mammographic appearance and histopathology," Cancer 104 (5), 931 (2005).

Burhenne, L.W., et al., "Potential contribution of computer-aided detection to the sensitivity of screening mammography," Radiology 215 (2), 554 (2000).

Catarious, Jr., D.M., et al., "Incorporation of an iterative, linear segmentation routine into a mammographic mass CAD system," Med Phys 31 (6), 1512 (2004).

Catarious, Jr., D.M., et al., "Characterization of difference of Gaussian filters in the detection of mammographic regions," Med Phys 765 33 (11), 4104 (2006).

Clark, M., et al., "Texture segmentation using gabor modulation and demodulation," pattern Recognition letters 6, 261 (1987).

Doi, K., et al., "Computer-aided diagnosis in radiology: potential and pitfalls," European Journal of Radiology. 31(2):97 (1999).

Dunn, D., et al., "Optimal Gabor filters for texture segmentation," Image Processing, IEEE Transactions on 4 (7), 947 (1995).

Freer, T.W., et al., "Screening mammography with computer-aided detection: prospective study of 12,860 patients in a community breast center," 660 Radiology. 220 (3), 781 (2001). A model-based framework for the detection of spiculated lesions on mammography, Sampat et al. 43.

Giger, M.L., "Computer-aided diagnosis of breast lesions in medical images," Computing in Science & Engineering 2 (5), 39 (2000).

Giger, M.L., et al., "Computer-aided diagnosis in medical imaging," IEEE Transactions on Medical Imaging 20 (12), 1205 (2001).

Giger, M.L. "Computer-Aided Diagnosis in Radiology," Acad. Radiol. (2002), 9:1-3.

Gur, David, et al., "Changes in Breast Cancer: Importance of Spiculation in Computer-Aided Detection System," Journal of the National Cancer Institute, (2004), 96 (3) 185-190.

Haley, M., et al., "Rotation-invariant texture classification using a complete space-frequency model," Image Processing, IEEE Transactions on 8 (2), 255 (1999).

Heath, M.D., et al., "Mass Detection by Relative Image Intensity," presented at the 5th International Workshop on Digital Mammography, Toronto, Canada, 2000.

Heath, M.D., et al., "The Digital Database for Screening Mammography," presented at the 5th International Workshop on Digital Mammography, Toronto, Canada, 2000, 10 pages.

Jain, K., et al., "Unsupervised texture segmentation using Gabor filters," Pattern Recognition 24 (12), 1167 (1991).

Kak, Avinash C., et al., "Computerized Tomography Using Video Recorded Fluoroscopic Images," IEEE Transactions on Biomedical Engineering, vol. BME-14, No. 2, Mar. 1977, pp. 157-169.

Karrssemeijer, N., et al., "Detection of stellate distortions in mammograms," Medical Imaging, IEEE Transactions on 15 (5), 611 (1996).

Kegelmeyer, Jr., W.P., et al., "Computer-aided mammographic screening for spiculated lesions," Radiology 191 (2), 331 (1994).

Kerlikowske, M.D., et al., "Performance of Screening Mammography Among Women with and without a First-Degree Relative with Breast Cancer," Ann. Intern. Med., (2000), 133:855-863.

Kolb, Thomas M., et al., "Comparison of the Performance of Screening Mammography, Physical Examination, and Breast US and Evaluation of Factors that Influence Them: An Analysis of 27,825 Patient Evaluations," Radiology 225 (1), 2002, pp. 165-175.

Lee, Carol H., "Screening Mammography: Proven Benefit, Continued Controversy," Radiol. Clin. N. Am. 40, (2002), pp. 395-407.

Li, Lihua, et al., "X-Ray Medical Image Processing Using Directional Wavelet Transform," IEEE, (1996), pp. 2251-2254.

Li, Lihua, et al., "Digital Mammography: Computer-Assisted Diagnosis Method for mass Detection with Multiorientation and Multiresolution Wavelet Transforms," Acad. Radio., (1997), 4:724-731.

Liberman, L., et al., "The Breast imaging reporting and data system: positive predictive value of mammographic features and final assessment categories," AJR. American Journal of Roentgenology. 171(1):35 (1998).

Liu, S., et al., "Multiresolution detection of speculated lesions in digital mammograms," IEEE Transactions on Image Processing 10 (6), 874 (2001).

Sampat, M.P., et al., "Detection of spiculated lesions in mammograms," presented at the Proceedings of the 25th Annual International Conference of the IEEE Engineering in Medicine and Biology Society, Cancun, Mexico, 2003.

Sampat, M.P., et al., "Evidence-based detection of spiculated masses and architectural distortions," presented at the Medical Imaging 2005: Image Processing, San Diego, CA, 2005.

Sampat, M.P., et al., "Computer-Aided Detection and Diagnosis in Mammography," Book Handbook of Image and Video Processing, Edited by A.C. Bovik, Academic Press, (2005), 36 pages.

Sampat, M.P., et al., "The reliability of measuring physical characteristics of spiculated masses on mammography," British Journal of Radiology 79, S123 (2006).

Sampat, M.P., et al., "Comparison of algorithms to enhance spicules on spiculated lesions on mammography," Journal of Digital Imaging (2007).

Sampat, M, P., et al., "A Model-Based Framework for the Detection of Spiculated Masses on Mamography," Med. Phys. 35:2110-2123 (2008).

Saunders, R., et al., "Simulation of Mammographic Lesions," Acad Radiol 13 (7), 860, (2006).

Te Brake, M., et al., "Automated detection of breast carcinomas not detected in a screening program," Radiology 207 (2), 465 (1998).

Te Brake, M., et al., "An Automatic Method to Discriminate Malignant Masses from Normal Tissue in Digital mammograms," Physics in Medicine & Biology, 45 (10), 2843 (2000).

Teuner, A., et al, "Unsupervised Texture Segmentation of Images Using Tuned Matched Gabor Filters," Image Processing, IEEE Transactions on 740 4 (6), 863, (1995).

U.S. Food and Drug Administration, "Summary of Safety and Effectiveness Data: R2 Technologies, (P970058)," 1998.

Varela, et al., "Use of Prior Mammograms in the Classification of Benign and Malignant Masses," Euro. J. Radiol. 56 (2). 248 (2005).

Vyborny, et al., "Computer-Aided Detection and Diagnosis of Breast Cancer," Radiologic Clinics of North America, 38 (4), 725 (2000).

Vyborny, et al., "Breast Cancer: Importance of Spiculation in Computer-Aided Detection," Radiology, 215 (3), 703 (2000).

Weldon, et al., "Efficient Gabor Filter Design for Texture Segmentation," Pattern Recognition,) vol. 29, No. 12, pp. 2005-2015, (1996).

Woods, Kevin, Ph.D., "Computer-Aided Diagnosis and Automated Screening of Digital Mammogram," University of South Florida, Grant No. DAMD17-94-J-4328, (1997), 19 pages.

Yang, et al., "Screening Mammography-Detected Cancers: Sensitivity of a Computer-Aided Detection System Applied to Full-Field Digital Mammograms," Radiology 244 (1), 104 (2007).

* cited by examiner

METHOD AND APPARATUS FOR DETECTING SPICULATED MASSES IN MAMMOGRAPHY

CROSS-REFERENCE TO RELATED APPLICATIONS

This patent application claims priority to U.S. provisional patent application Ser. No. 61/049,326, filed on Apr. 30, 2008 and entitled "Model-Based Framework for the Detection of Spiculated Masses on Mammography," which is hereby incorporated by reference in its entirety.

STATEMENT OF FEDERALLY FUNDED RESEARCH

This invention was made with U.S. Government support under Contract No. W81XWH-04-1-0406 awarded by the U.S. Army Medical Research and Materiel Command. The government has certain rights in this invention.

TECHNICAL FIELD OF THE INVENTION

The present invention relates in general to the field of image processing and more particularly to the computer-aided detection of breast cancer.

BACKGROUND OF THE INVENTION

Without limiting the scope of the invention, its background is described in connection with computer-aided detection of breast cancer. The American Cancer Society estimates that 178,480 women will be diagnosed with breast cancer in the U.S. in 2007 [1] and 40,460 women will die of the disease. In the U.S., breast cancer is the most common form of cancer among women and is the second leading cause of cancer deaths, after lung cancer [1]. Women in the U.S. have about a 1 in 8 lifetime risk of developing invasive breast cancer [2,3]. Early detection of breast cancer increases the treatment options for patients and also increases the survival rate.

Screening mammography, or x-ray imaging of the breast, is currently one effective tool for early detection of breast cancer. Screening mammographic examinations are performed on asymptomatic woman to detect early, clinically unsuspected breast cancer. Two views of each breast are recorded: the craniocaudal (CC) view, which is a top to bottom view, and the mediolateral oblique (MLO) view, which is a side view. Radiologists visually search mammograms for specific abnormalities. The most common signs of breast cancer that radiologists look for are clusters of microcalcifications and masses. A mass is a space-occupying lesion seen in at least two different projections [4]. Masses with spiculated margins carry a much higher risk of malignancy than other types of masses or calcifications. Spiculated masses account for about 14% of biopsied lesions, and about 81% of these are malignant [5].

Early detection via mammography increases breast cancer treatment options and the survival rate [6]. However, mammography is not perfect. Detection of suspicious abnormalities is a repetitive and fatiguing task. For every thousand cases analyzed by a radiologist, only 3 to 4 cases are malignant and thus an abnormality may be overlooked. As a result, radiologists fail to detect 10-30% of cancers [7-9]. Approximately two-thirds of these false-negative results are due to missed lesions that are evident retrospectively [10].

Computer-Aided Detection (CADe) systems have been developed to aid radiologists in detecting mammographic lesions that may indicate the presence of breast cancer [11-15]. These systems act as a second reader and the final decision is made by the radiologist. Most studies have shown that CADe systems, when used as an aid, improve radiologists' accuracy in the detection of breast cancer [16-18], though some studies have found no increase in the number of cancers detected [19].

Current CADe systems are dramatically better at detecting microcalcifications than masses. The most widely used commercial CADe system is reported to have a 98.5% sensitivity at 0.185 false positives per image (FPI) for microcalcification clusters and a 86% sensitivity at 0.24 FPI for spiculated masses [18]. However, the results vary considerably on different datasets. For example, clinical studies to evaluate the performance of commercial CADe systems for mass detection, have reported sensitivities ranging from 67% to 89% with the FPI ranging from 0.40 to 0.74 FPI [16,17,20-22]. For normal images FP rates of 1.3 to 1.8 FPI have been reported [22,23].

A number of references have focused on the detection of spiculated masses because of their high likelihood of malignancy. The main idea behind previous approaches to the detection of spiculated masses is that since they are characterized by spicules radiating in all directions, one should compute the edge orientations at each pixel. Thus, each pixel is represented by a feature vector, which represents the strongest edge orientation at the pixel. The edge orientation can be computed in a variety of different ways.

For example, Kegelmeyer et al. [24] developed a method to detect spiculated masses using a set of 5 features for each pixel. They used the standard deviation of a local edge orientation histogram (ALOE) and the output of four spatial filters, which are a subset of Law's texture features. The idea of using the ALOE feature is that, as a normal mammogram exhibits a tissue structure that radiates in a particular orientation (from the nipple to the chest), it would have edge orientations primarily in that direction. While in regions containing spiculated lesions, edges would exist in many different orientations. To detect these differences, Kegelmeyer et al. [24] computed the edge orientations in a window around each pixel and then generated a histogram of the edge orientations.

Another example can be seen in Karssemeijer et al. [25] where Karssemeijer detected spiculated masses by a statistical analysis of a map of pixel orientations. The orientation at each pixel was computed from the response of three filter kernels, which are second-order, directional derivatives of a Gaussian kernel in three directions $(0, \pi/3, 2\pi/3)$. These filters form a non-orthogonal basis. They used the relation that at a particular scale, the output at any orientation can be expressed as a weighted sum of the responses of the filters. This was used to determine the orientation at each pixel, and two features for each pixel were derived by a statistical analysis of these pixel orientation maps. The pixels were then classified as suspicious or normal.

Yet another example is found in Liu and Delp [26]. Liu and Delp noted that, in general, it is difficult to estimate the size of the neighborhood that should be used to compute the local features of spiculated masses. Small masses may be missed if the neighborhood is too large and parts of large masses may be missed if the neighborhood is too small. To address this problem they developed a multi-resolution algorithm for the detection of spiculated masses [26]. A multi-resolution representation of a mammogram using the Discrete Wavelet Transform was generated and four features at each resolution for each pixel were extracted. Pixels were then classified using a binary classification tree.

One can also see that Zhang et al. [27] noted that the presence of spiculated lesions led to changes in the local mammographic texture. They proposed that such a change could be detected in the Hough Domain, which is computed using the Hough Transform. They partitioned an image into overlapping ROIs and computed the Hough Transform for each ROI. The Hough Domain of each ROI was thresholded to detect local changes in the mammographic texture and to determine the presence or the absence of a spiculated mass.

Finally, Zwiggelaar et al. [28] proposed a model-based approach for the detection of spiculated masses. They described a technique to characterize patterns of linear structures using Principal Component Analysis and Factor Analysis. They created statistical models of spiculations created using regions-of-interest containing spiculated masses.

However, all of these references lack data on physical properties of spiculated masses and the old computer-aided algorithm generates many false positive detections. As a result, there is a need for a system and method for detecting spiculated masses in an image (e.g., mammogram that detects and enhances the spiculated masses while reducing the number of false positives.

SUMMARY OF THE INVENTION

The present invention presents a new model-based framework for the detection of spiculated masses that uses a new class of filters called Spiculated Lesion Filters (SLF), in order to detect the spatial location where spicules converge. In addition, the present invention also includes a new Radon-Domain technique for enhancing spicules in mammograms. The enhancement is achieved by computing the Radon Transform of the image and filtering in the Radon Domain.

The physical properties of spiculated masses can be measured reliably [29]. The parameters of the models are based on the spicule widths and lengths, diameter of the central mass, the number of spicules, and the major and minor axes of central mass regions obtained from the measurement demonstration. The present invention also includes models to reduce the false positives due to normal linear structures (e.g., blood vessels). This is accomplished by using oriented Difference-of-Gaussian filters to identify and create a likelihood map of potential normal structures.

In certain embodiments, the present invention describes a method of analyzing an image including the steps of performing spiculation filtration at least once on the image to enhance lines and detect spatial locations of the lines where the lines converge. The method also may include detecting central mass region of the converged lines by computing maximum output value across each pixel of the imaging using Gaussian Filters; calculating false positives using difference-of-Gaussian filters at each of the spatial location; and identifying one or more converged lines.

The step of performing spiculation filtration may further include the steps of computing a radon transformation of the image thereby producing a radon domain; filtering the radon domain using Spiculated Lesion Filters thereby forming patterns of line structures; and applying an inverse radon transformation to the patterns of line structures thereby obtaining an enhanced image with identifiable lines.

In certain embodiment, Spiculated Lesion Filters include at least one Spiculated Filter, wherein each Spiculated Filter has cosine and sine Spiculated Filters. In some embodiments, the sine or cosine spiculation filters may have the same or different $\sigma$, for $r_0$ values. The method of analyzing an image also may include detecting central mass region of the converged lines by computing maximum output value across each pixel of the imaging using Gaussian Filters; calculating false positives using difference-of-Gaussian filters at each of the spatial location; and identifying one or more converged lines. In certain embodiments, the method of analyzing an image further includes the step of thresholding the radon transformation or outputting the results to identifiers and produces information for the location of the converged lines. In one embodiment, the image is a mammogram or a digital image of a mammogram.

In another embodiment, the present invention provides a method of detecting one or more spiculated masses in an image using a processor. The image is received in the processor. The received image is filtered using one or more Gaussian filters to detect one or more central mass regions. The received image is also filtered using one or more spiculated lesion filters to detect where the one or more spiculated masses converge. In addition, the received image is filtered using one or more Difference-of-Gaussian filters to suppress one or more linear structures. An enhanced image showing the detected spiculated masses is created by combining an output from all of the filtering steps. The enhanced image is then provided to an output of the processor. The method can be implemented using a computer program embodied on a computer readable medium wherein the steps are performed by one or more code segments.

In yet another embodiment, the present invention provides an apparatus having a processor, a memory communicably coupled to the processor, and one or more communication interfaces communicably coupled to the processor. The processor receives an image from the communication interface or the memory, filters the received image using one or more Gaussian filters to detect one or more central mass regions, filters the received image using one or more spiculated lesion filters to detect where the one or more spiculated masses converge, filters the received image using one or more Difference-of-Gaussian filters to suppress one or more linear structures, creates an enhanced image showing the detected spiculated masses by combining an output from all of the filtering steps, and provides the enhanced image to the memory or the communication interface.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The detection of lesions on mammography is a repetitive and fatiguing task. Thus, Computer-Aided Detection (CADe) systems have been developed to aid radiologists. The detection accuracy of current systems is much higher for clusters of microcalcifications than for spiculated masses. The present invention goes beyond state of the art systems by providing a new model-based framework for the detection of spiculated masses with a new class of linear filters called Spiculated Lesion Filters, for the detection of converging lines or spiculations. These filters are highly specific narrowband filters, which are designed to match the expected structures of spiculated masses. As a part of this algorithm, the present invention provides a novel technique to enhance spicules detections in mammograms. This entails filtering in the Radon Domain. Models were also developed to reduce the false positives due to normal linear structures. One key contribution of this invention is that the parameters of the detection algorithm are based on measurements of physical properties of spiculated masses.

Figure 1:
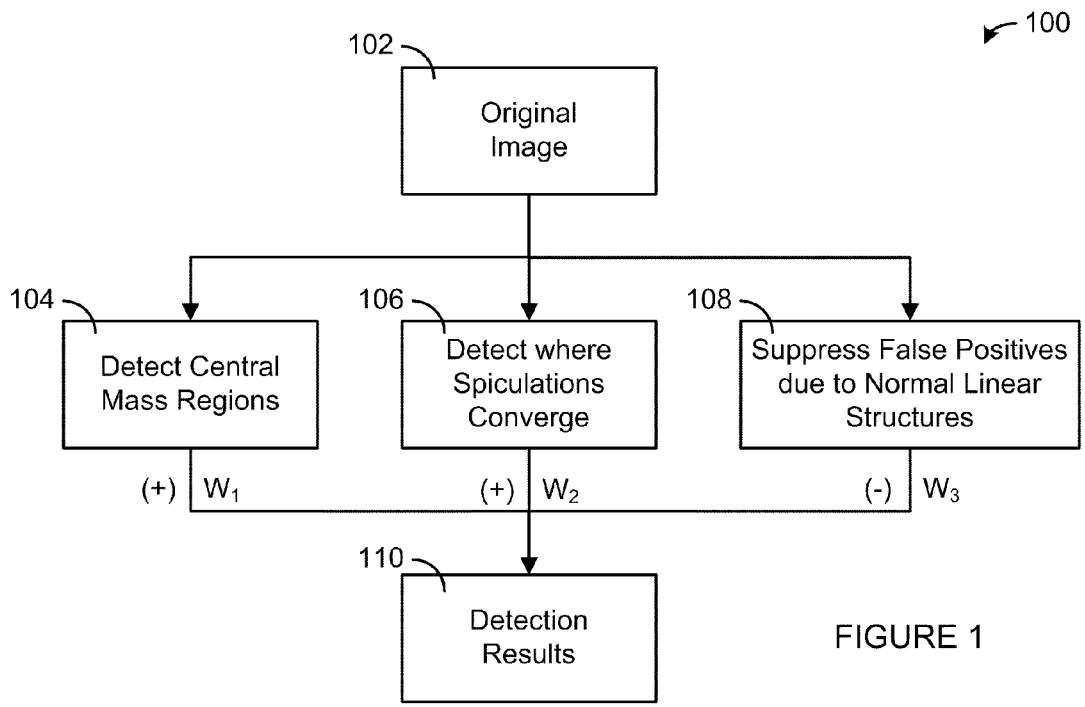
FIG. 1 is a flow chart of a detection algorithm in accordance with one embodiment of the present invention.

Now referring to FIG. 1, a flow chart of a detection algorithm 100 in accordance with one embodiment of the present invention is shown. An original image (e.g., an image of a mammogram, a digital image of a mammogram, etc.) is obtained or provided in block 102. The original image is then analyzed using three main components (filters) in parallel: a central mass detector or filter 104; a spiculation convergence detector or filter 106; and a false positives detector or filter 108. The central mass detector for filter 104 detects the central mass regions of the spiculated masses. The spiculation convergence detector or filter 106 enhances spicules and detects the spatial locations where spicules converge. The false positives detector or filter aims to reduce false positives due to normal linear structures (e.g., blood vessels, etc.). The outputs of these filters 104, 106 and 108 are summed together to provide the detection results 110. Various weights $W_1$, $W_2$ and $W_3$ can be applied to the outputs of the filters 104, 106 and 108.

The central mass detector or filter 104 detects the central mass region of the spiculated masses using Gaussian Filters. While other studies have used Gaussian Filters for mass detection, key differences in the present invention are that the size of the filters were selected from the measurement data and that a set of 25 Gaussian Filters was used. The maximum output value across all Gaussian Filters computed at each pixel (Gaussian_Maxima) represents the likelihood of the presence of a mass.

Figure 2:
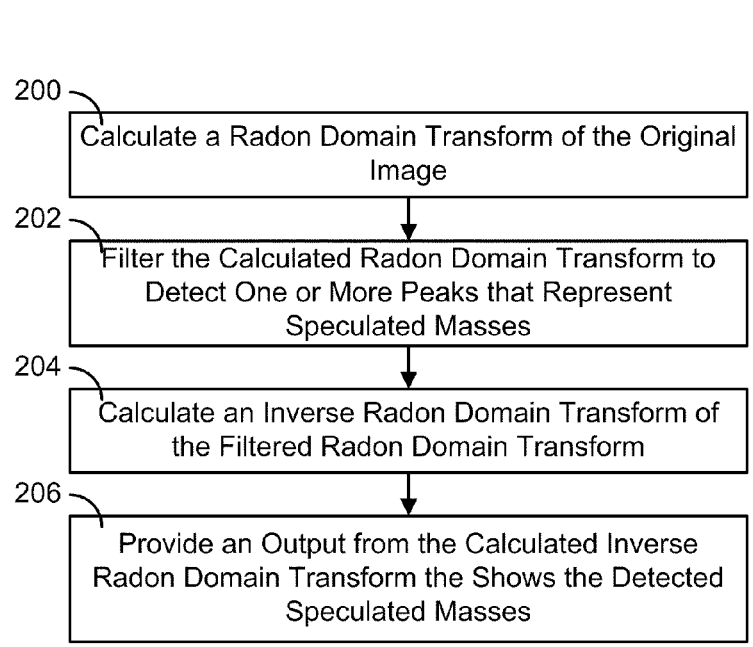
FIG. 2 is a flow chart of a Spiculated Lesion Filter or Spicule Enhancement Algorithm in accordance with one embodiment of the present invention.

Referring now to FIG. 2, a flow chart of a Spiculated Lesion Filter or Spicule Enhancement Algorithm (also referred to as the spiculation convergence detector or filter) 106 in accordance with one embodiment of the present invention is shown. The Spiculated Lesion Filter 106 is designed to detect patterns of converging linear structures using a processor. A Radon Domain transform of the original image is calculated in block 200. The calculated Radon Domain transform is filtered (e.g., a column filter, etc.) to detect one or more peaks that represent the one or more spiculated masses in block 202. An inverse Radon Domain transform of the filtered Radon Domain Transform is calculated in block 204. An output from the calculated inverse Radon Domain Transform is provided in block 206 that shows the detected spiculated masses.

One of the most prominent features of spiculated masses is the presence of spicules radiating in all directions. The present invention enhances spicules, approximated as curvilinear structures, by filtering in the Radon Domain. The Radon Transform $g(\rho,\theta)$ of a continuous function $f(x,y)$ is defined as [30]:

$$g(\rho, \theta) = \int_{y=-\infty}^{y=+\infty} \int_{x=-\infty}^{x=+\infty} f(x, y)\delta(\rho - x\cos(\theta) - y\sin(\theta)) \cdot dx\,dy \qquad \text{Equation 1}$$

where $\delta(r)$ is the Dirac delta function [31] and $\rho$ and $\theta$ are parameters of the Radon Domain. Thus, for any given line in an image, $\rho$ is the length of a perpendicular line segment from the origin to the line and $\theta$ is the orientation of the line segment with respect to the x-axis. The term $\delta(\rho-x\cdot\cos(\theta)-y\sin(\theta))$ in Equation 1 computes the integral of $f(x,y)$ along the line $\rho=x\cdot\cos(\theta)+y\cdot\sin(\theta)$ and thus the value of $g(\rho,\theta)$ for any $(\rho,\theta)$ is the integrated density of $f(x,y)$ along this line. Thus, a line in the image space $f(x,y)$ produces or maps to a point in the Radon Domain. In addition, lines of different thickness have different representations in the Radon Domain. For example, a single pixel thick line would be represented by a point in the Radon Domain, whereas a 4 pixel thick line would be represented by 4 points along a column in the Radon Domain. Thus, by enhancing sharp changes or "local peaks" along the columns in the Radon Domain, it is enabled to detect the corresponding lines in the image by applying a peak detection algorithm.

In certain embodiments, the filter: $[-1.25,-1.25,1,1,1,1,1,-1.25,-1.25]^T$ can be used to detect peaks along the columns in the Radon Domain. This particular filter was chosen based on the thickness of the spicules obtained. As the sum of coefficients of the filter is zero, the response of this filter to an area of constant or slowly varying values will be zero or very small. After filtering in the Radon Domain, the Inverse Radon Transform is computed using the filtered back-projection algorithm [32] to obtain an image in which linear structures have been enhanced:

$$f(x, y) = \int_0^\pi Q_\theta(x \cdot \cos(\theta) + y \cdot \sin(\theta)) d\theta \qquad \text{Equation 2}$$

$$Q_\theta(t) = \int_{-\infty}^\infty S_\theta(w)|w|\exp^{j2\pi wt} dw \qquad \text{Equation 3}$$

The enhanced image $f(x,y)$ is obtained using Equation 2, where $Q_\theta(t)$ is defined in Equation 3 and $S_\theta(w)$ is the 1-D Fourier Transform of $g_\theta(r)$ [32]. Thus, the output of the enhancement stage is a line-enhanced image and all subsequent processing is performed on this image.

Figure 3A:
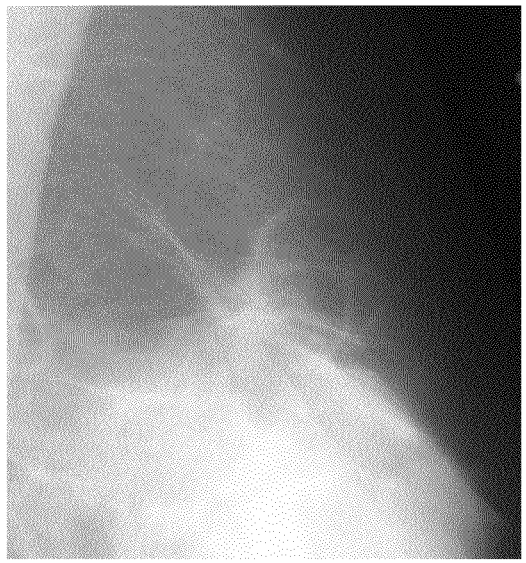
FIGS. 3A-3D are pictures showing two regions of interest containing spiculated masses (FIGS. 3A and 3C) and the results of the enhancement algorithm (FIGS. 3B and 3D) in accordance with one embodiment of the present invention.
Figure 3B:
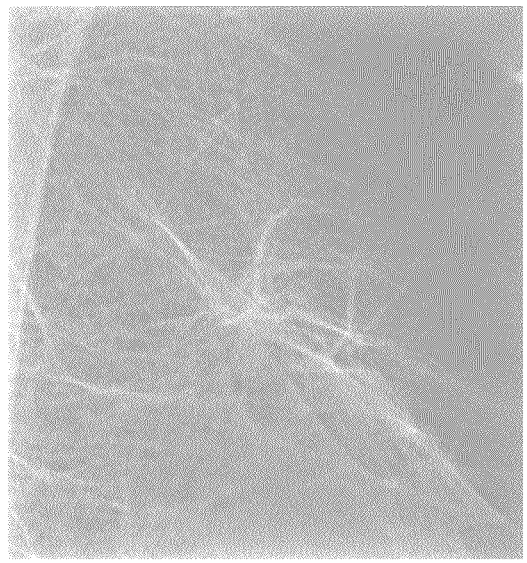
Figure 3C:
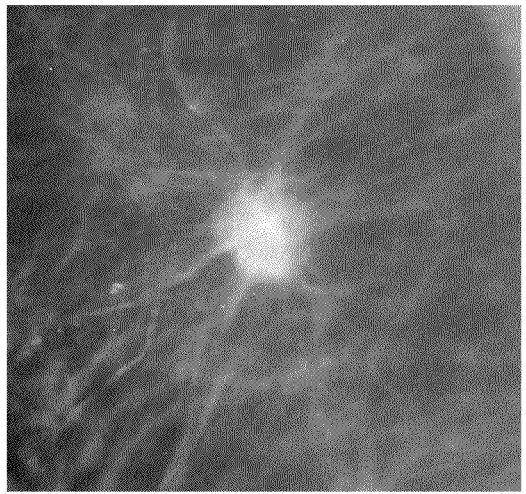
Figure 3D:
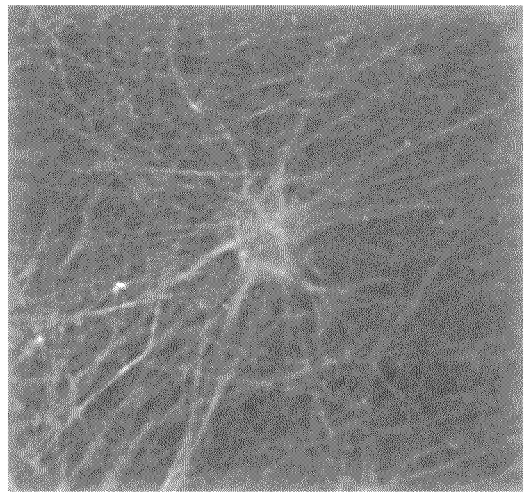
Figure 4A:
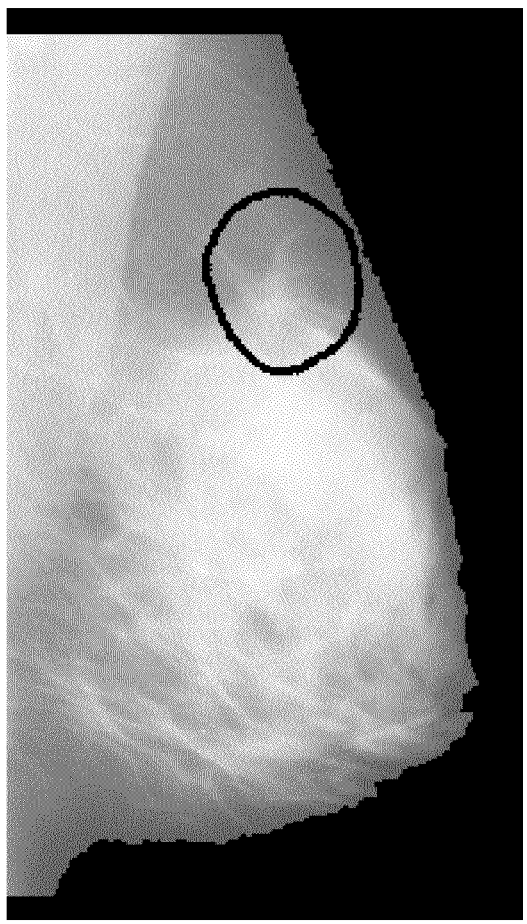
FIGS. 4A and 4B are pictures of a spiculated lesion on an original mammogram (FIG. 4A) and an enhanced image (FIG. 4B) in accordance with one embodiment of the present invention.
Figure 4B:
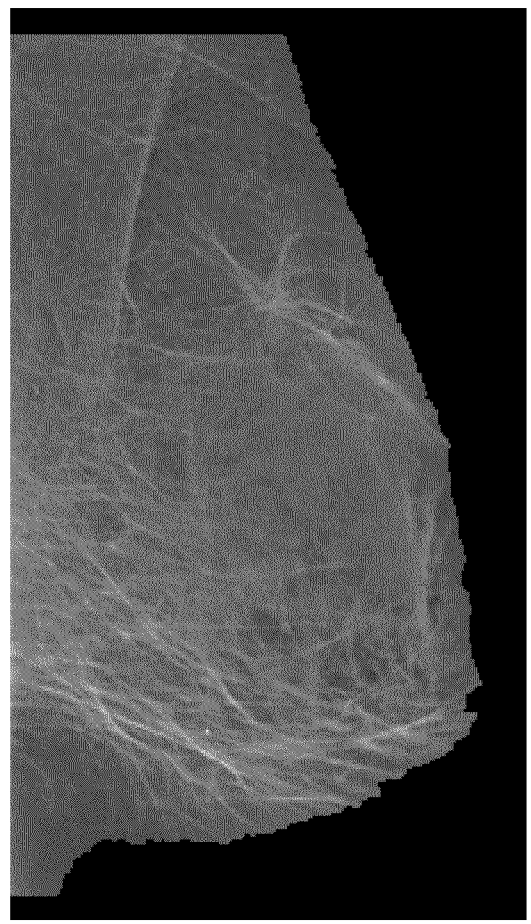
Figure 11A:
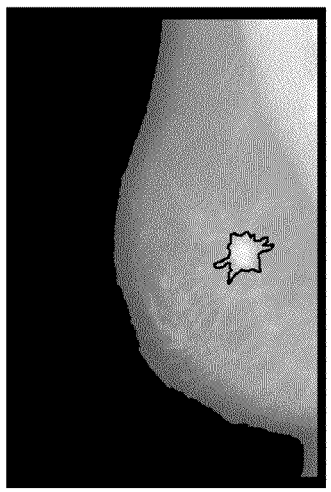
FIGS. 11A to 11F show the output obtained at each step of the detection algorithm using a first set of images in accordance with one embodiment of the present invention.
Figure 11B:
Figure 11C:
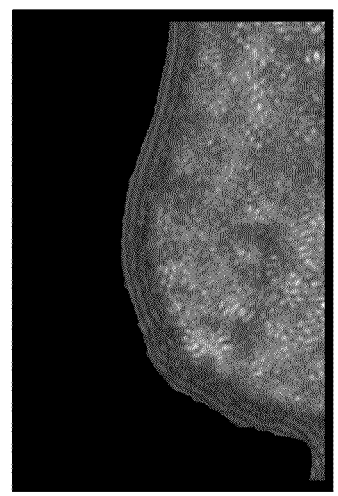
Figure 11D:
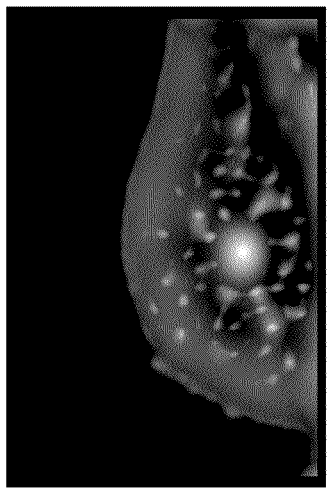
Figure 11E:
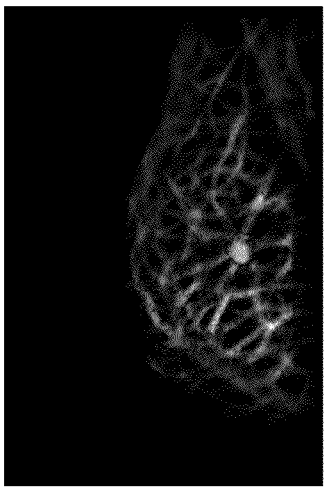
Figure 11F:
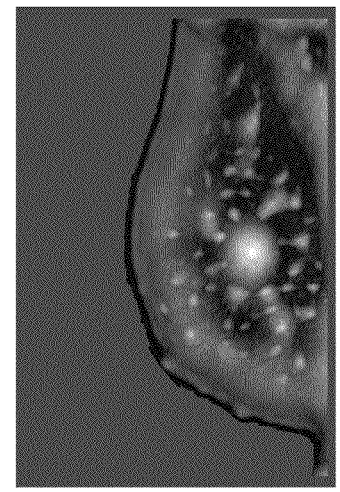
Figure 12A:
FIGS. 12A to 12F show the output obtained at each step of the detection algorithm using a second set of images in accordance with one embodiment of the present invention
Figure 12B:
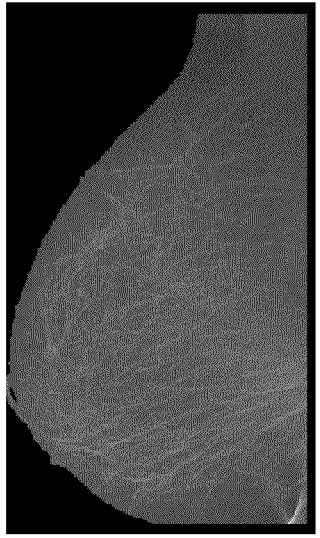
Figure 12C:
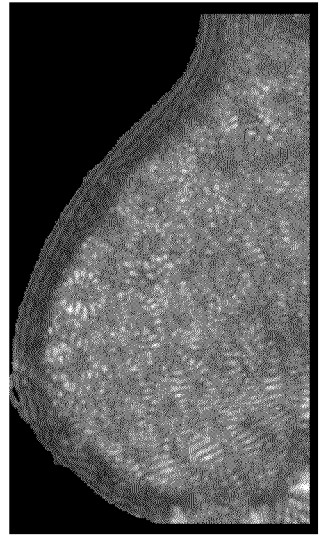
Figure 12D:
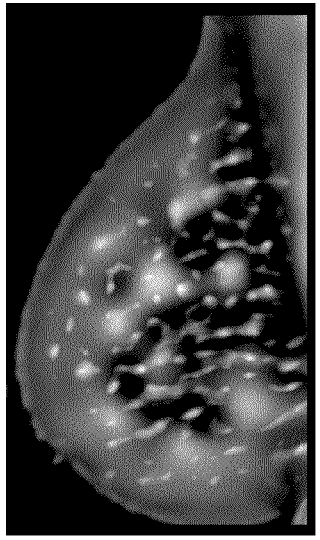
Figure 12E:
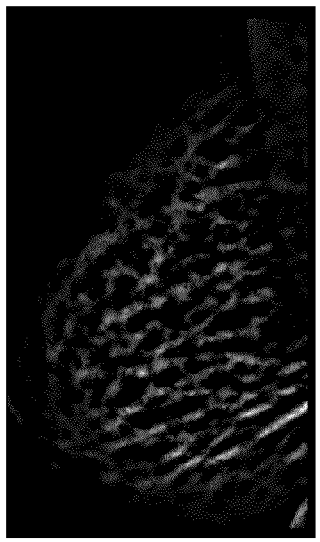
Figure 12F:
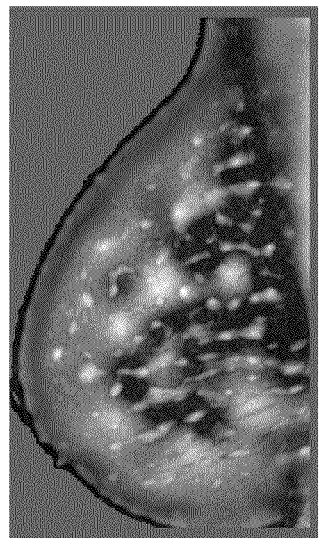
Figure 13A:
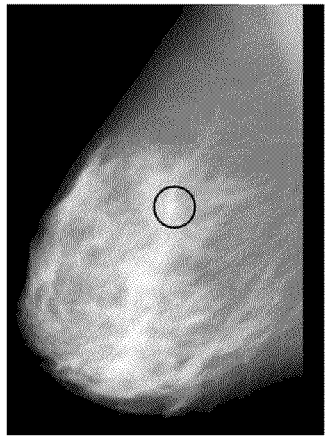
FIGS. 13A to 13F show the output obtained at each step of the detection algorithm using a third set of images in accordance with one embodiment of the present invention.
Figure 13B:
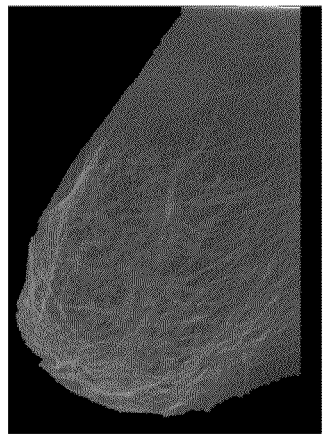
Figure 13C:
Figure 13D:
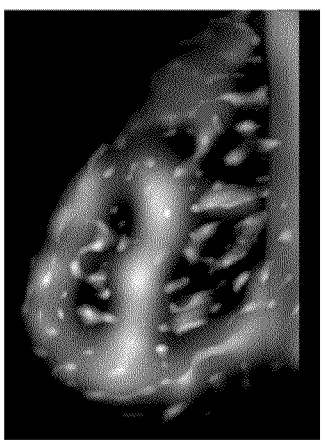
Figure 13E:
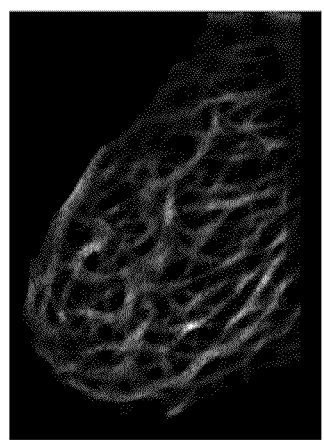
Figure 13F:
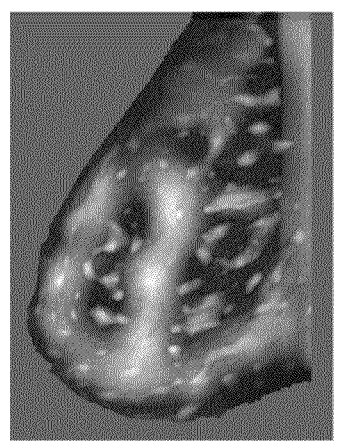

For example, FIGS. 3A and 3C are pictures showing two regions of interest containing spiculated masses. The results of the enhancement algorithm 106 are shown in FIGS. 3B and 3D, respectively. In another example, FIG. 4A shows an original image with a spiculated lesion on a mammogram (circled). FIG. 4B shows the image obtained after applying the enhancement algorithm 106. Note that small subtle spiculations are also enhanced and that FIG. 3A was a region of interest selected from FIG. 4A. Other examples of the results of the enhancement algorithm can be found in FIGS. 11B, 12B and 13B.

The most common approach to computing a discrete Radon Transform is based on calculating the projection of the image intensities along radial lines oriented at specific angles. Recently, the Fast Slant Stack method [33] was developed to compute a discrete form of the Radon Transform of an image. An observer demonstration was conducted that compared the effect of using the traditional approach to discretizing the Radon Transform versus the new FSS algorithm in the spicule enhancement strategy [34]. The observers preferred the images enhanced with the FSS approach, so that technique is preferable used to discretize the Radon Tranform.

As described above, the present invention includes a new class of filters, Spiculated Lesion Filters, to detect the spatial locations where spiculations converge [35,36]. A fundamental idea is to design a "matched filter" for a spiculated lesion. The basic building blocks of the Spiculated Lesion Filters (SLF) are Spiculation Filters, which are a new class of complex quadrature filters.

The Spiculation Filter consists of quadrature components which are the so-called cosine ($f_c(r,\theta; r_0,\sigma,\omega)$) and sine ($f_s(r,\theta; r_0,\sigma,\omega)$) Spiculation Filters. These components are shown in FIGS. 4(a) and 4(b) and are defined as follows:

$$f_c(r;\theta; r_0,\sigma,\omega)=g(r; r_0,\sigma)\cos(\omega\theta) \qquad \text{Equation 4}$$

$$f_s(r;\theta; r_0,\sigma,\omega)=g(r; r_0,\sigma)\sin(\omega\theta) \qquad \text{Equation 5}$$

$$g(r; r_0,\sigma)=\exp((r-r_0)^2/2\sigma^2) \qquad \text{Equation 6}$$

where: $r=\sqrt{x^2+y^2}$ and $\theta=\tan^{-1}(y/x)$ and $\sigma$ is the standard deviation in pixels.

The parameter $r_0$ is a size parameter measured in pixels, and $\omega$ is the modulation frequency measured in cycles per circumference. The Gaussian torus is defined by Equation 6. The Spiculation Filters can also be written in the overall phasor form as follows: $h(r,\theta; r_0,\sigma,\omega)=f_c(r,\theta; r_0,\sigma,\omega))+if_s(r,\theta; r_0,\sigma,\omega)$. Also note that the RMS value $\sqrt{f_c^2+f_s^2}$ of the quadrature components is equal to the toroidal Gaussian envelope function g ($r; r_0,\sigma$). The complex Spiculation Filter has the advantage that the sum of the squared responses of the two quadrature components is phase independent. Thus, the filter will have the same response to a spiculation even if it has been rotated.

Figure 5A:
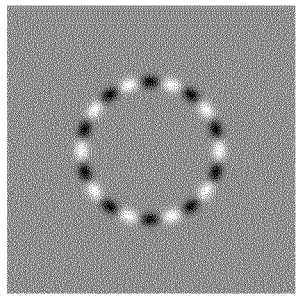
FIGS. 5A to 5E are example pictures of a Spiculation Filter and Spiculated Lesion Filters) in accordance with one embodiment of the present invention.
Figure 5B:
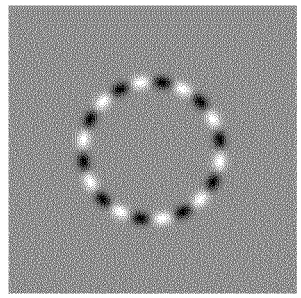
Figure 5C:
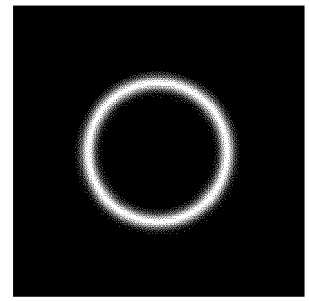
Figure 5D:
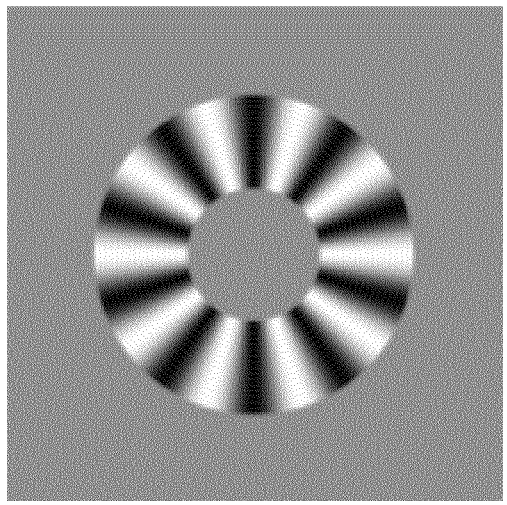
Figure 5E:
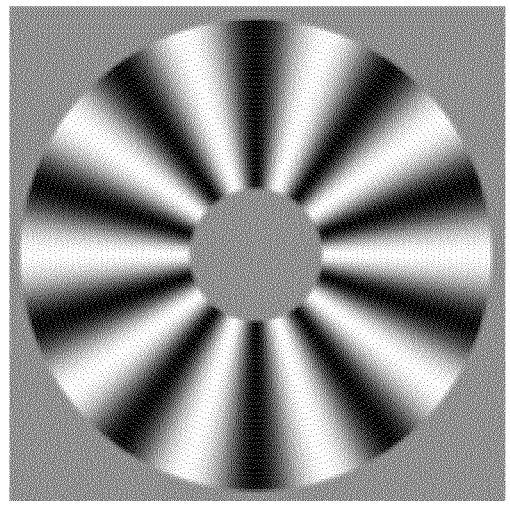

The response of a Spiculation Filter to a spiculated lesion is important, but it only supplies some information regarding the pattern as only a band of a given radius is analyzed. By combining multiple Spiculation Filters to form a Spiculated Lesion Filter (SLF), overall spiculated lesion responses may be obtained (examples in FIGS. 5D and 5E). FIGS. 5A to 5E are examples of a Spiculation Filter and Spiculated Lesion Filters (SLFs). FIGS. 5A and 5B show the two-quadrature components of the Spiculation Filter, namely, the cosine and sine Spiculation Filters, respectively. The toroidal Gaussian envelope of the Spiculation Filter is shown in FIG. 5C. In FIGS. 5D and 5E, two Spiculated Lesion Filters, each composed of Spiculation Filters of progressively increasing radii and matching radial frequencies are shown. The SLFs in FIGS. 5D and 5E have the same inner radius but different outer radii. These would correspond to lesions where the central mass is the same size but the spicule lengths differ. The SLF can be made to match the size of the central mass region of a spiculated mass by appropriate selection of the inner filter radius. Likewise, spicule length can be matched to the SLF by appropriate selection of the inner and the outer filter radii, the difference between these corresponding to spicule length. Of course, the physical parameters of a particular lesion cannot be known beforehand, and hence a single appropriate SLF cannot be predetermined. The present invention uses measurement data to support the selection of the inner and outer radii $r_{inner}$ and $r_{outer}$ for each SLF, as well as the frequency $\omega$ of each SLF.

Figure 6A:
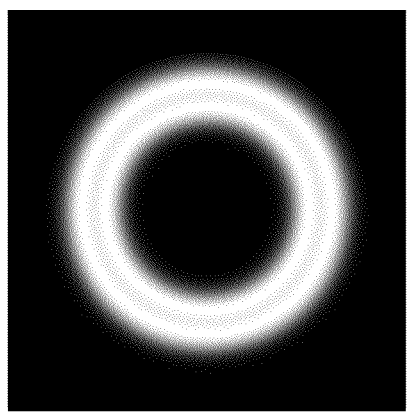
FIGS. 6A and 6B show the toroidal components of two Spiculation Filters of a Spiculated Lesion Filter (FIG. 6A) and a cross-section through these components (FIG. 6B) in accordance with one embodiment of the present invention.
Figure 6B:
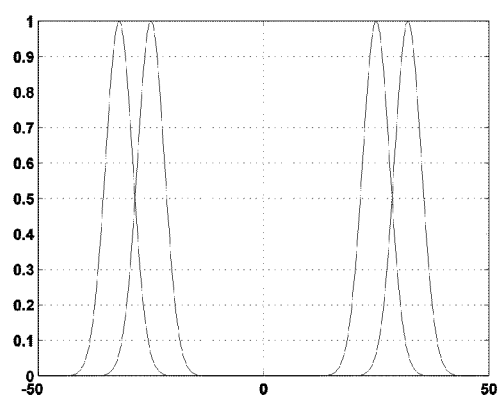

The filters are chosen such that the component toroidal Gaussian envelopes intersect at their half-peak values, a strategy that ensures that there will be no gaps in the responses along the radial directions. This approach has been shown to be efficacious in numerous studies involving Gabor filter applications [37-39]. If the radius of a single Spiculation Filter is $r_1$ and the toroidal component of that filter is given by $g(r; r_1,\sigma)$, then $r_2$, the radius of the next Spiculation Filter in the SLF, is $r_2=r_1+2.3548\cdot\sigma$. FIG. 6A shows the toroidal components of two Spiculation Filters of a SLF and FIG. 6B shows a cross-section through these components. FIG. 6A shows the toroidal components of two Spiculation Filters of a Spiculated Lesion Filter and FIG. 6B shows a cross-section through these components. The filters are chosen such that the component toroidal Gaussian envelopes intersect each other at their half-peak values, a strategy that ensures that there will be no gaps in the responses along the radial directions.

The normalized cross correlation (NCC) was used for filtering the enhanced image with each SLF. Let T be a SLF of size M-by-M pixels and let I be the image of size L-by-L such that M<<L. The NCC is defined as follows:

$$NCC(i, j) = \frac{1}{\sigma_T \cdot \sigma_I} \sum_{k=1}^{M} \sum_{m=1}^{M} \{((T(k,m) - \mu_T) \cdot I(i+k-1, j+m-1) - \mu_I(i,j))\} \quad \text{Equation 7}$$

$$\sigma_T = \sqrt{\sum_{k=1}^{M} \sum_{m=1}^{M} (T(k,m) - \mu_T)^2}$$

$$\sigma_I = \sqrt{\sum_{k=1}^{M} \sum_{m=1}^{M} (I(i+k-1, j+m-1) - \mu_I(i,j))^2}$$

where $\mu_T$ is the mean of the template and $\mu_T(i,j)$ is the mean of the sub-image centered at (i,j). Let $OP_{cos}$ and $OP_{sin}$ be the outputs obtained after filtering the enhanced image with the two quadrature components of the SLF (cosine and sine SLFs). The magnitude response $OP_{mag}$ and the phase response $OP_{phase}$ of the SLF are defined as:

$$OP_{mag} = \sqrt{(OP_{cos})^2 + (OP_{sin})^2} \quad \text{Equation 8}$$

$$OP_{phase} = \arctan(OP_{sin}/OP_{cos}) \quad \text{Equation 9}$$

The magnitude response $OP_{mag}$ of the SLF is smoothed with a Gaussian filter (sigma=2). This post filtering has been shown to be beneficial in numerous demonstrations involving Gabor filter applications [37-39]. If the SLF "matches" a spiculated lesion, a peak would be obtained at the spatial location corresponding to the center of the spiculated lesion. Thus, suspicious regions can be identified by detecting the local peaks in the overall output. Note that the larger the overall output at a particular spatial location, the higher the likelihood that the spatial location corresponds to the center of a spiculated lesion. A likelihood map for the locations of spiculated masses, SLF_Maxima, is computed by taking the maximum SLF output across all SLFs.

$$\text{SLF\_Maxima}(x,y) = \max\{\text{SLF}_1(x,y), \text{SLF}_2(x,y) \ldots, \text{SLF}_N(x,y)\}(\forall x,y) \quad \text{Equation 10}$$

Now referring back to FIG. 1, a false positives detector or filter 108 is used to suppressing false positives due to normal linear structures in the parenchyma. In addition to spicules, structures such as blood vessels, ducts, and other linear elements in the tissue parenchyma can also be enhanced. The Spiculated Lesion Filters can respond to the criss-crossings of these normal structures and thus generate false positives. A strategy based on oriented Difference-of-Gaussian (DoG) Filters is used to identify and suppress false positives.

Figure 7:
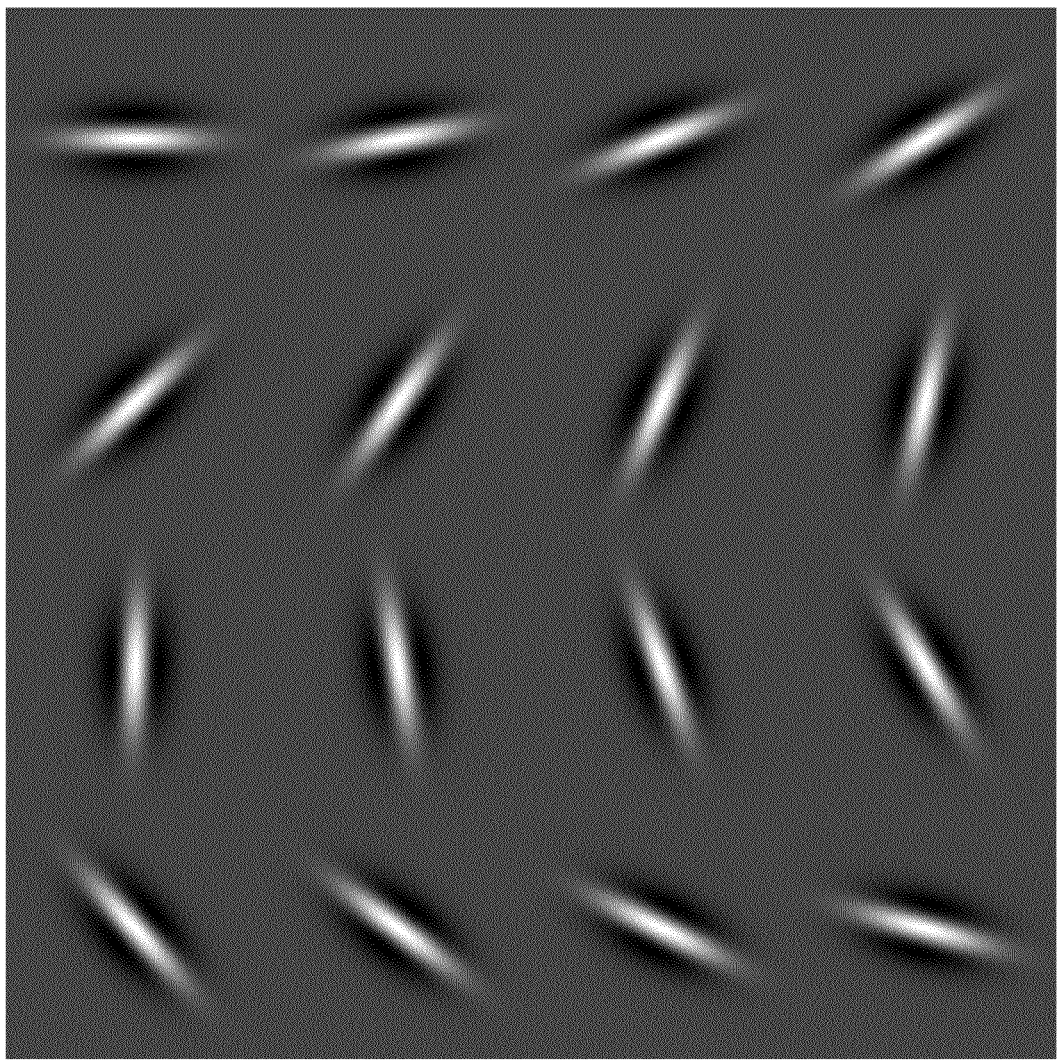
FIG. 7 is a picture showing a subset of the elongated and oriented DoG Filters) in accordance with one embodiment of the present invention.

At each spatial location the image is filtered with an elongated and oriented Difference-of-Gaussian (DoG) filter (FIG. 7). FIG. 7 shows a subset of the elongated and oriented DoG Filters used in accordance with the present invention. The output of these filters is used to suppress the FPs due to linear structures such as blood vessels and ducts. The orientation of this filter was the local orientation ($\theta_{i,j}$) at that spatial location: $\theta_{i,j} = \arctan(Gy/Gx)$, where Gy and Gx are the gradients in the y and x directions, respectively. Since the goal is to identify linear structures that are not spicules, the width of the central lobe is greater than the largest width of the spicules measured.

Now referring back to FIG. 1, the outputs of these filters 104, 106 and 108 are summed together to provide the detection results 110. As both the Spiculated Lesion Filters 106 and the Gaussian Filters 104 provide evidence for the presence of a spiculated mass, the outputs from these filters are summed up in the overall detection output 110. The responses from the oriented DoG Filters 108 denote the likelihood of normal structures (e.g., blood vessels) and thus they are subtracted in the overall detection output. Thus, Overall Output = $W_1 \cdot$ Gaussian_Maxima + $W_2 \cdot$ SLF_Maxima − $W_3 \cdot$ DoG_Response where, $W_1$, $W_2$, $W_3$ are weights that can be applied to the output of each of the components of the detection algorithm. In this study, we weighted the output of the components equally.

Figure 9:
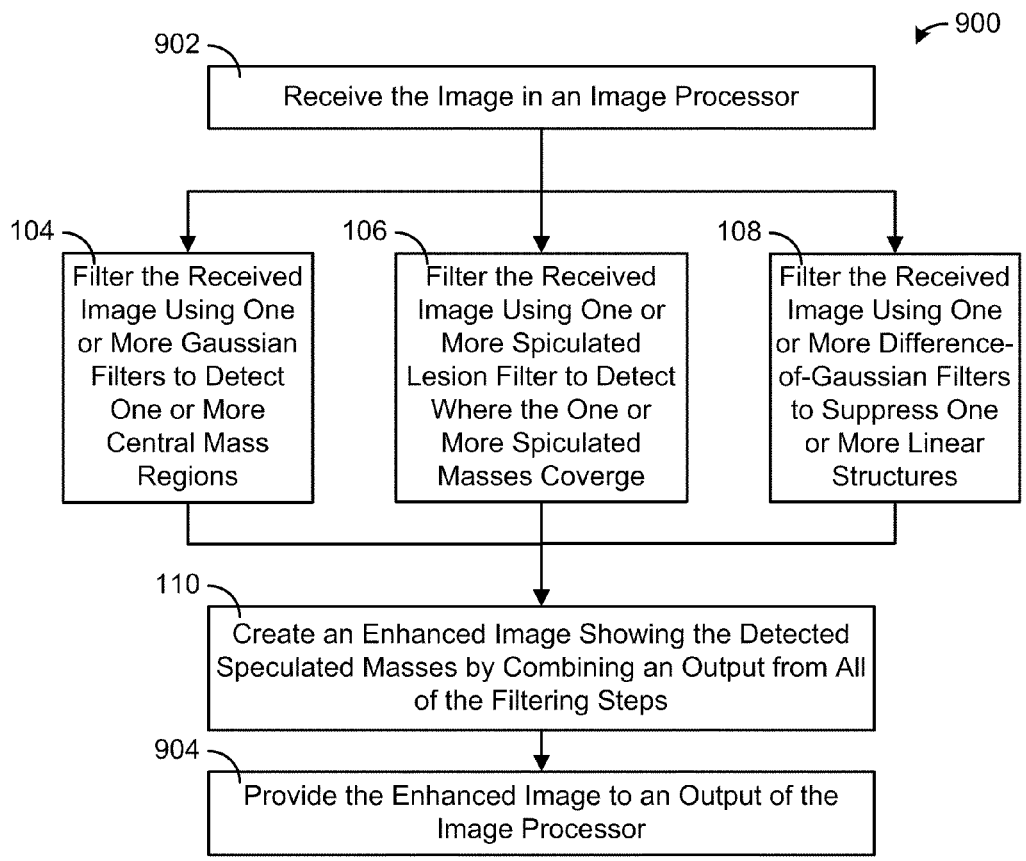
FIG. 9 is a flow chart of a method for detecting one or more spiculated masses in an image using a processor in accordance with one embodiment of the present invention.

Referring now to FIG. 9, a flow chart of a method 900 for detecting one or more spiculated masses in an image using a processor in accordance with one embodiment of the present invention is shown. The image (e.g., an image of a mammogram, a digital image of a mammogram, etc.) is received in the processor in block 902. The received can be loaded from a memory, a portable storage medium, a personal data assistant, a scientific device/instrument, a hard disk, a floppy disk, an optical drive, a flash memory, a compact disc, a digital video disc, a remote location via a communication link, an image scanner, a mammogram, or other suitable devices or media. The received image is filtered using one or more Gaussian filters to detect one or more central mass regions in block 104. The received image is also filtered using one or more spiculated lesion filters to detect where the one or more spiculated masses converge in block 106. In addition, the received image is filtered using one or more Difference-of-Gaussian filters to suppress one or more linear structures in block 108. An enhanced image showing the detected spiculated masses is created in block 110 by combining an output from all of the filtering steps. The enhanced image is provided to an output of the processor in block 904. The output of the processor can be a communications interface, a display, a printer, a memory, a portable storage medium, a personal data assistant, a scientific device/instrument, a hard disk, a floppy disk, an optical drive, a flash memory, a compact disc, a digital video disc, a remote location via a communication link, an image scanner, a mammogram, or other suitable devices or media. Note that steps 104, 106 and 108 can be performed in parallel (as shown) or sequentially in any order since they are not dependant upon one another. Also note that the methods described herein can be implemented using a computer program embodied on a computer-readable medium wherein the steps are performed by one or more code segments.

Figure 10:
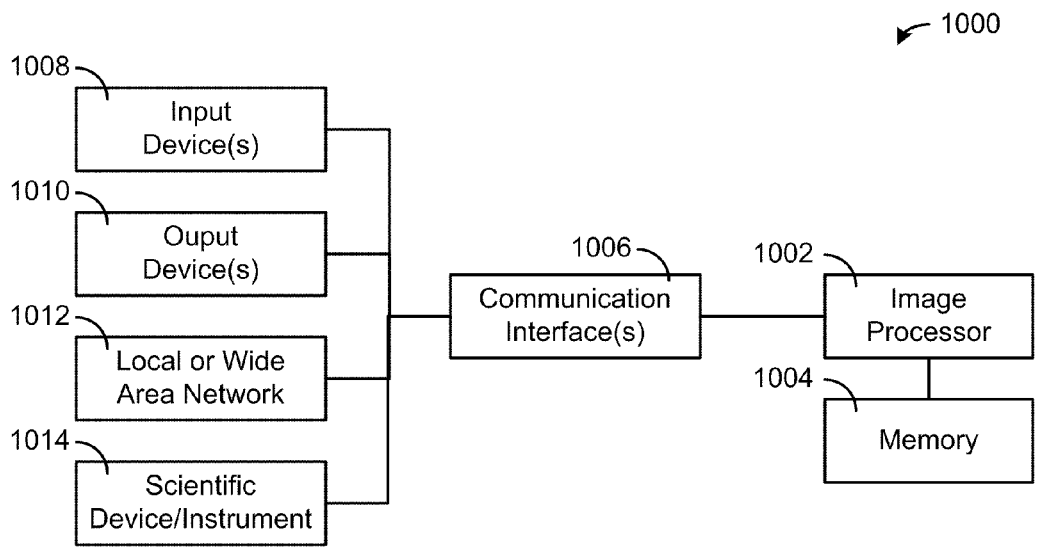
FIG. 10 is a block diagram of an apparatus for detecting one or more spiculated masses in an image in accordance with one embodiment of the present invention.

Now referring to FIG. 10, a block diagram of an apparatus 1000 for detecting one or more spiculated masses in an image in accordance with one embodiment of the present invention is shown. The apparatus 1000 can be a computer, a personal data assistant, a hand-held device, a digital processor, an image processing card, an integrated circuit, scientific device/instrument, computer aided detection device or other suitable device. The processor 1102 can be hardware or a combination of hardware and software that performs the method described in reference to FIG. 1, 2 or 9. The processor 1102 is communicably coupled to a memory 1104 and one or more communication interfaces 1006. The communication interface(s) 1006 is communicably coupled to one or more input devices 1008, one or more output devices 1010, one or more local or wide area networks 1012 (e.g., office, hospital or laboratory network, the Internet, etc.), and/or one or more scientific devices/instruments (e.g., X-ray machine or imaging device for creating mammograms, etc.).

The present invention was tested with three sets of images. Two sets of images were obtained from the Digital Database for Screening Mammography (DDSM) [40] and one from the Mammographic Image Analysis Society (mini-MIAS) [41].

The DDSM is the largest publicly available dataset of digitized mammograms and consists of 2,620 cases. Each abnormality has been outlined by a radiologist and this was used as the "ground truth" for detection of spatial locations of spiculated lesions. Thus, if the output of the detection algorithm was located within this outline, then it was counted as a True Positive output. Note that as we do not aim to 'segment' the mass and thus the 'boundary' marked on images in the DDSM database, is adequate for assessing our algorithm. The images in the DDSM database were scanned at 50 microns. For computational efficiency, in this demonstration, the present invention decimated the images from the DDSM database by a factor of four and thus the image resolution was 200 microns.

The images in the mini-MIAS database have a resolution of 200 microns and each image has been clipped or padded so that it is 1024*1024 pixels [41]. The x and y image coordinates of the center of the abnormality and the radius (in pixels) of circle enclosing the abnormality are provided and the ground truth is created from this data. Thus, if the output of the detection algorithm was located within this circular region, then it was counted as a True Positive output.

Image Set 1 was used for measurement. A set of twenty-one images of spiculated masses from the DDSM database was used for the measurement demonstration. All images were MLO view images from a single scanner and a range of image density ratings were represented in this set [29].

Image Set 2 from mini-MIAS database was used for testing. A set of 50 images from the mini-MIAS database [41] was used to test the detection algorithm. This set consists of all 19 spiculated masses and the first 31 normal images from the mini-MIAS database. These images were scanned with a single digitizer, each contained a single lesion and all images were MLO view images.

Image Set 3 from the DDSM database was also used for testing. A set of 100 images from the DDSM database was used to test the detection algorithm. This set consists of 50 images of spiculated masses and 50 normal images. The selected cases were digitized by a single scanner and represented a range of density ratings, subtlety ratings, and pathology. There was no overlap between the images used in the measurement and those used to evaluate the detection algorithm.

The measurement of physical parameters will now be described. The present invention uses the ROI Manager plugin of NIH ImageJ to enable a user, with minimal training, to place markers at specific locations, and compute the Euclidean (pixel) distance between the markers. This interface allows for measurement of spicule width both at the base of the spicule (where it meets the mass) as well as at other points along the spicule. The user can also measure the lesion dimensions of the central region along the principal axes. In addition, the operator can trace the spicule along its entire length using straight lines, to determine spicule length and the user can count the spicules associated with a lesion. Since the resolution of the images is known, the pixel measurements can be converted into physically meaningful quantities (e.g., mm).

A radiologist (GJW) used NIH ImageJ to measure the length and the width at the base for all spicules from each spiculated mass. One also measured the length of the major axis of the central region of each lesion. The number of spicules that were visible for each lesion were also counted.

Table 1 summarizes the measurements made by the radiologist for the various parameters of spiculated masses. Table 1 includes average measurements (mm) made by the radiologist (GJW) (standard deviation) across all spicules, all MLO images for spiculated masses. These measurements represent the average value across twenty-one spiculated masses. The details of this measurement study can be obtained in the paper by Sampat et al. [29]. In previous work [Sampat et al. [29]], we demonstrated that it is feasible to make reliable measurements of the physical properties of spiculated masses on mammography using this system.

TABLE 1

| Major Axis | Spicule Width | Spicule Length | Number of Spicules |
|---|---|---|---|
| 15.10 (±7.98) | 1.00 (±0.296) | 8.80 (±2.62) | 17.57 (±6.01) |

The selection of detection algorithm parameters is based on the measurement data. The average width of spicules in the measurements was 5 pixels (1 mm). Thus, to enhance spicules, each column of the Radon transform of the image is convolved with: $[-1.25,-1.25,1,1,1,1,1,-1.25,-1.25]^T$.

Figure 8:
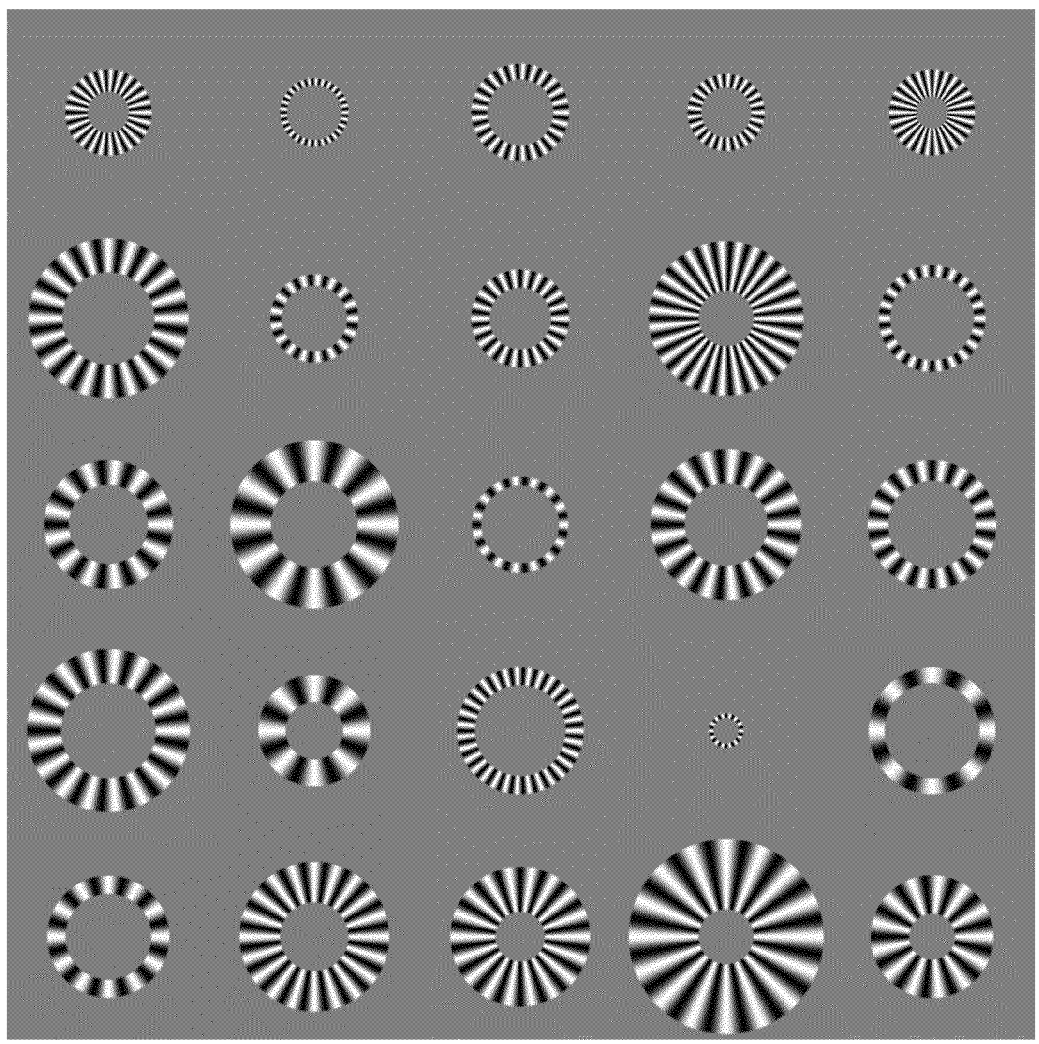
FIG. 8 is a picture of a set of 25 Spiculated Lesion Filters (SLFs) used for the detection of spiculated masses) in accordance with one embodiment of the present invention.

To account for variability in the shape and the structure of spiculated lesions, SLFs with different parameters are used. The joint probability density function of the three variables (central mass region radius, length of spicules, and the number of spicules) was calculated by the kernel method with Gaussian kernels [42]. The joint estimate was then randomly sampled to select the parameters of the SLFs (FIG. 8) and the Gaussian filters. FIG. 8 shows the set of 25 SLFs used for the detection of spiculated masses. To select the parameters of these SLFs an estimate of the joint PDF of the central mass region radius, length of spicules, and number of spicules was obtained. This joint estimate of the PDF was then randomly sampled to select the parameters of the SLFs. For the Gaussian filters, the parameter sigma was selected so that the half peak radius was equal to radii measurements obtained after the random sampling of the joint density function (sigma=radius/1.177). Note that while all of the parameters are based on the measurement data, the number of filters was an empirical choice that could be optimized in future studies.

Now referring to FIGS. 11, 12 and 13, the response of each step of the detection algorithm in accordance with the present invention is shown. FIGS. 11A, 12A and 13A show the original image and the ground truth outlined by the radiologist. FIGS. 11B, 12B and 13B demonstrate the effect of the spicule enhancement algorithm. The output after filtering with the Spiculated Lesion Filters is shown in FIGS. 11C, 12C and 13C. The output after filtering with a bank of Gaussian filters is used to detect the central mass region in FIGS. 11D, 12D and 13D. The oriented DoG filters are used to suppress some linear structures in FIGS. 11E, 12E and 13E. Finally, FIGS. 11F, 12F and 13F show the overall output of the detection algorithm.

Figure 14:
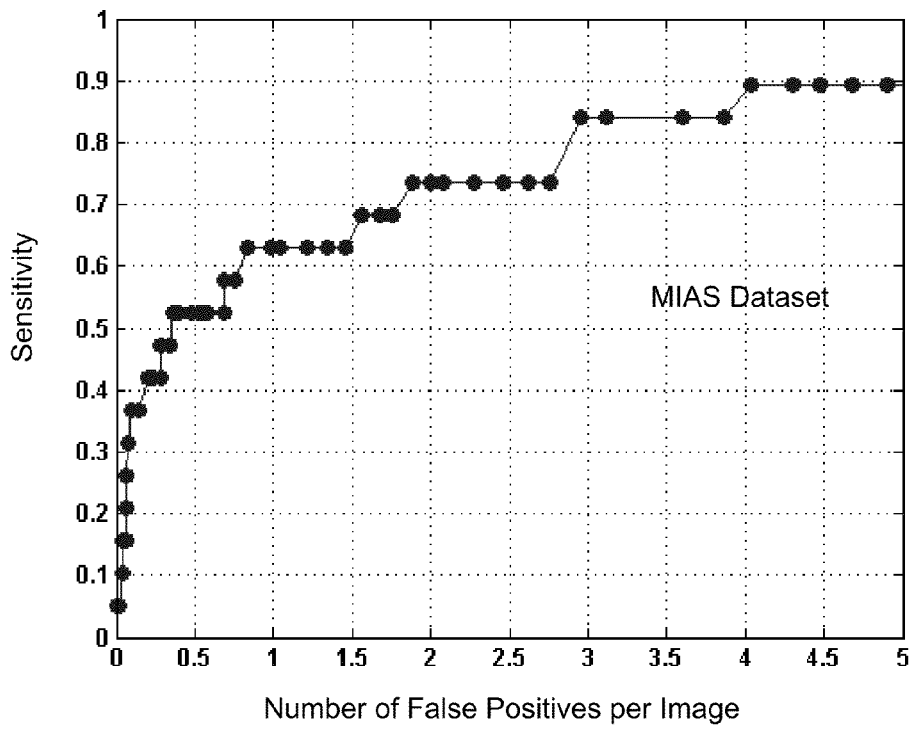
FIG. 14 is a plot of performance of the detection algorithm reported using FROC curves in accordance with one embodiment of the present invention.
Figure 15:
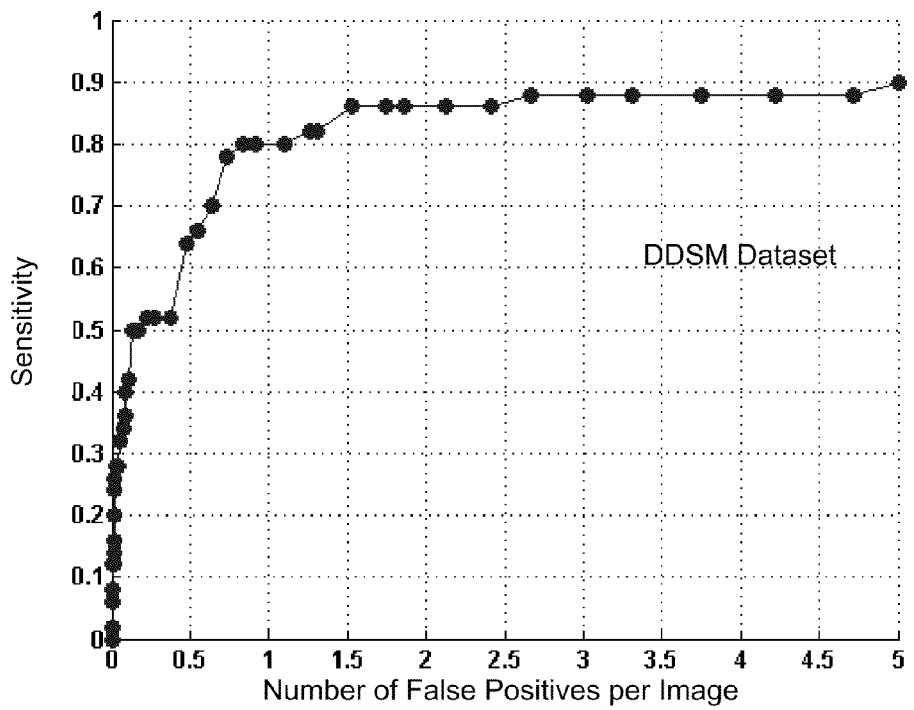
FIG. 15 is another plot of the performance of the detection algorithm is reported using FROC curves in accordance with one embodiment of the present invention.
Figure 16:
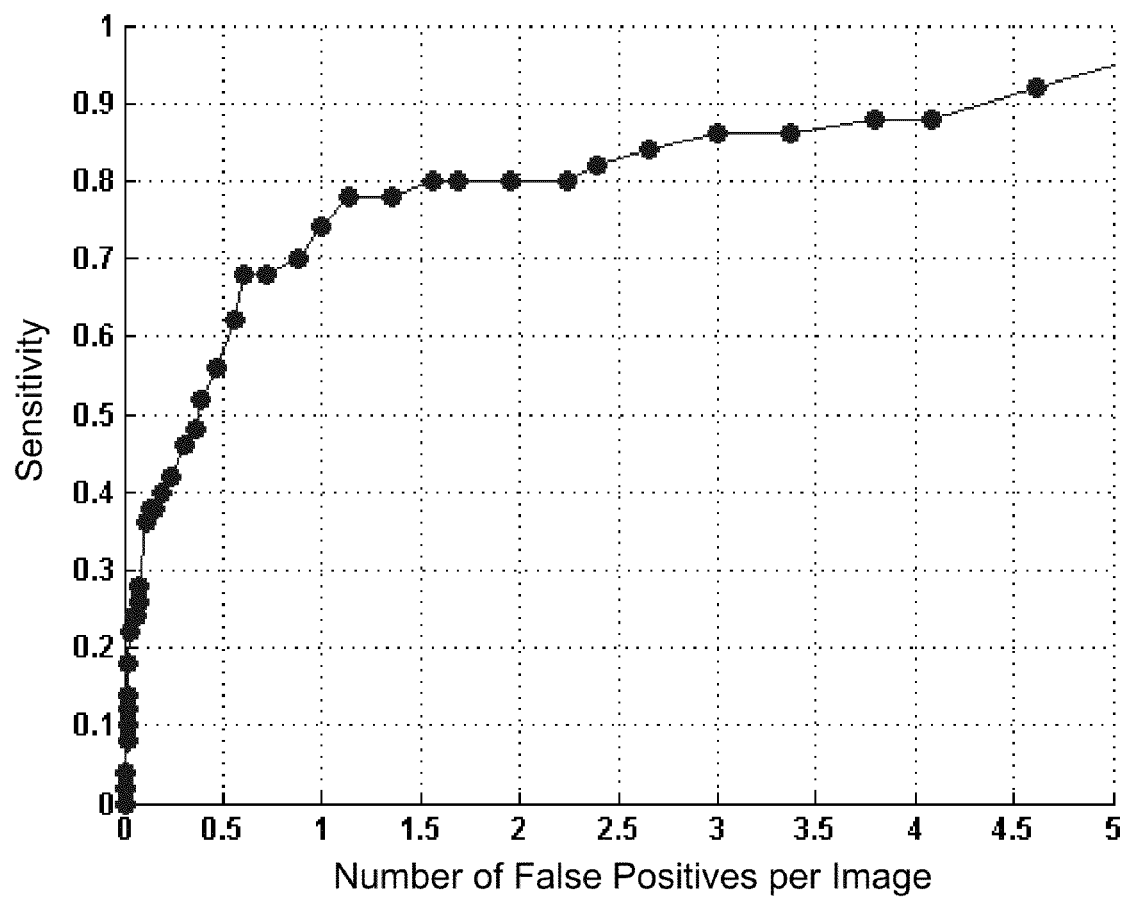
FIG. 16 is yet another plot of performance of the detection algorithm is reported using FROC curves in accordance with one embodiment of the present invention.

Now referring to FIGS. 14-16, Free-response Receiver Operating Characteristic (FROC) curves were generated to report the performance of the detection algorithm in accordance with the present invention. A FROC curve is obtained by plotting sensitivity on the y-axis and the number of false positives per image on the x-axis.

The overall output from the detection algorithm is normalized by subtracting the mean and dividing by the standard deviation. A threshold is applied to the normalized overall output and pixels that have a value greater than the threshold are viewed as potential lesions. A pixel is counted as a true positive if it lies within the ground truth outlined by the radiologist. If multiple pixels within the ground truth are marked, they are all counted as a single true positive. Moreover, a pixel was marked only if the distance between it and any other marked pixel was at least the average radius of the central mass region.

At each threshold of the detection output, the FROC curve provides the sensitivity and FPI. As shown in FIG. 14, a sensitivity of 84% at 3 FPI was obtained for the images from the MIAS dataset. FIG. 13 shows the performance of the detection algorithm reported using FROC curves. The y-axis of the FROC curve corresponds to the sensitivity of the algorithm and the x-axis corresponds to the number of FPI per image. For the set of 50 images from the MIAS database the demonstration achieved a sensitivity of 84% at 3 FPI for the detection of spiculated masses. This set contained all 19 images of spiculated masses from the MIAS database and 31 normal images.

As shown in FIG. 15, a sensitivity of 88% at 2.7 FPI was obtained for a set of 50 images of spiculated masses and 50 normal images from the DDSM. FIG. 14 is the performance diagram of the detection algorithm reported using FROC curves. The y-axis of the FROC curve corresponds to the sensitivity of the algorithm and the x-axis corresponds to the number of FPI per image. For the set of 100 images from the DDSM database we achieved a sensitivity of 88% at 2.7 FPI for the detection of spiculated masses. This set contained 50 images of spiculated masses and 50 normal images.

Table 2 summarizes the performance of prior algorithms developed for the detection of spiculated masses. It also presents the number of training and testing images used in each demonstration. From Table 2 we see that the number of spiculated masses used in previous detection demonstrations is quite small. The present invention presented a new model-based framework for the detection of spiculated masses.

were localized and measured by a radiologist, whereas in the study by Zwiggelaar linear structures were automatically detected and only a random subset were annotated by a radiologist.

As shown above, the present invention demonstrates a new technique for enhancing spicules in mammograms based on filtering in the Radon Domain. The parameters of the filter are chosen based on the width of spicules obtained from the measurement studies. The related Hough Transform has been applied for the detection of spiculated masses by others [27]. However, a key innovation of the present invention (enhancement algorithm) is the filtering of the coefficients in the Radon Domain. This has not been proposed in CADe or other image processing applications.

The present invention shows a new class of filters called Spiculated Lesion Filters (SLFs) to detect the spatial location where spicules converge. The SLFs are configured to have sizes, frequencies, and extents derived from actual physical measurements.

The present invention created models for normal structures that may cause false positives (e.g., oriented Difference-of-Gaussian Filters to represent blood vessels).

The present inventors recognized the range of the properties of spicules of spiculated lesions. The strategy to reduce false positives is implemented in parallel with the other components of the detection algorithm, which are geared towards detecting converging spicules and central mass regions. In comparison, in previous approaches the reduction of false positives is carried out sequentially, after the detection of the abnormality. Finally, the motivation for the use of oriented DoG filters (instead of Gabor filters) to extract linear structures is derived from computational models of the Human Visual System (HVS) [46,47]. Numerous demonstrations of the HVS have shown that the HVS seems to have adapted DoGs for edge and line handling, whereas Gabor Filters

TABLE 2

| Author | Total # of Images | Total # of Spiculated Masses | # Training Images (# of Spiculated Masses) | # Testing Images (# of Spiculated Masses) | Sensitivity | FPI |
|---|---|---|---|---|---|---|
| Kegelmeyer [21] | 330 | 68 | 165 (34) | 165 (34) | 100 | — |
| Karssemeijer [22] | 50 | 19* | 14 | 50 (19*) | 90 | 1 |
| Delp [26] | 38 | 19 | 19 (9) | 19 (10) | 84.2 | 1 |
| Zwiggelaar [28] | 54 | 27 | (Leave-one-out cross validation method used) | | 70 | 0.01 |

The present invention uses measurements of lesion properties to guide the design of the detection algorithm. While others have measured physical characteristics of masses on mammography, most have only reported the mass size for mixtures of different types of masses. For example, Celia et al. reported the average mass size (from radiologists' annotations) for 99 malignant masses and 98 benign masses [43]. However, the mass sizes for spiculated masses only were not reported. Saunders et al. [44] measured the physical characteristics of masses and calcifications and these measurements were used to simulate breast masses and calcifications. A total of 152 masses were measured and the average size for malignant and benign masses was reported. The only demonstration where radiologists annotated spicules and other linear structures was conducted by Zwiggelaar et al. [45], on a set of 15 images. In this demonstration, cross-sectional profiles of linear structures were used to classify these structures as spicules, blood vessels, ducts, etc. In our study all spicules appear to be more appropriate for textures and area-based processing. Others have used Gabor filters for texture segmentation [37,38,48-53].

With respect to the detection results and number of false-positives, the demonstrations shown that the present invention obtained at least 84% sensitivity (at 3 FPI) and 88% sensitivity (at 2.7 FPI) for the mini-MIAS and DDSM datasets, respectively. The observation that results can vary considerably on different datasets is also seen with commercial CADe systems and it is difficult to get a reliable assessment of the performance of commercially available CADe systems on the detection of masses and spiculated masses. In an early report on the commercial CADe systems, the detection accuracy of microcalcifications was reported as 98.5% sensitivity at 0.74 false positives per case. The detection accuracy of masses was reported as 85.7% at 1.32 false-positive marks per case [56]. In a subsequent study, the CADe system is reported to have a 98.5% sensitivity at 0.185 false positives per image (FPI) for microcalcification clusters and a 86% sensitivity at 0.24 FPI for spiculated masses [18]. While the results of the detection of micro-calcifications are consistent, the detection results for masses vary considerably. For example, clinical demonstrations to evaluate the performance of commercial CADe systems for mass detection have reported sensitivities ranging from 67% to 89% with the FPI ranging from 0.40 to 0.74 FPI [16,17,20-22]. For normal images FP rates of 1.3 to 1.8 FPI have been reported [22,23]. It is likely that similar to the case of masses the performance of CADe may vary significantly on the detection of spiculated masses. Due to the novelty of the present invention, the industry has little to no demonstrations for the present inventors to get a reliable assessment of the performance of commercially available CADe systems on the detection of spiculated masses. Results of a given CADe algorithm may vary depending on the dataset used and two CADe algorithms and can only be directly compared when the same training and testing sets are used.

For the detection of masses (all types) in the DDSM, Heath et al. [57] reported a sensitivity of 80% at 4.5 FPI for the testing set. In another mass detection study, which used images from the DDSM, Catarious et al. [58] reported a sensitivity of 80% at 1.6 FPI and a sensitivity of 90% at 4.2 FPI. In a recent paper analyzing the effect of Difference-of-Gaussian (DoG) parameters, Catarious, et al. [59], reported a 81% sensitivity with FPI ranging from 1.35 to 3.66 FPI for different parameter values [59]. It has been reported that the DDSM is a difficult dataset. For example, to Brake et al obtained a better mass detection performance on the Nijmegen data-set (collected in the Netherlands) than on the DDSM data-set [60].

In certain embodiments, the present invention's algorithm is designed for the detection of spiculated masses, it could be applied in sequence with algorithms for detecting other types of lesions. Since this approach is different from other detection methods, it provides complementary information to the overall CADe algorithm. The present inventors found no reason to anticipate that our algorithm will generate more false-positives on images of non-spiculated lesions than on images of normal cases. For example, as shown in FIG. 16, on a set of 50 images each containing one non-spiculated mass, the present invention achieved a sensitivity of 86% at 3 FPI. FIG. 16 shows the FROC curve for a set of 100 images. This set contained 50 images of non-spiculated masses and 50 normal images. A sensitivity of 86% was obtained at 3 FPI. This shows that the algorithm does not generate false-positives on images of non-spiculated masses.

There are a number of advantages to using a model-based approach. The present inventors recognized that new knowledge about the properties of structures to be detected may be incorporated. Likewise, the present inventors also will add in detailed models of normal structures that lead to false positives (e.g., linear structures in the parenchyma).

The present invention provides a new model-based framework for the detection of spiculated masses. A new class of linear filters, Spiculated Lesion Filters, is used for the detection of converging lines or spiculations. These filters are highly specific narrowband filters, which are designed to match the expected structures of spiculated masses. As a part of this algorithm, a novel technique to enhance spicules on mammograms was developed. This entails filtering in the Radon Domain. The present invention also provides models to reduce the false positives due to normal linear structures. A key contribution of this invention is that the parameters of the detection algorithm are based on measurements of physical properties of spiculated masses.

Moreover, the present invention employs models of both normal and abnormal structures in mammograms and most parameters of the novel algorithm are selected based on measurements of normal and abnormal structures made by physicians. The present invention includes a new strategy for enhancing linear structures in mammograms by filtering in the Radon domain using a new class of filters for identifying where linear structures converge in mammograms. The present invention also provides many ways to reduce the number of false positives. For example, by obtaining a more complete database of measurements from which to parameterize the algorithm, by incorporating steps to analyze each suspicious region in more detail, and incorporating more models of normal structures.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

Note that the present invention can be implemented as a computer program embodied on a computer-readable medium where the various steps or functions are executed by one or more code segments. A computer-readable medium can be hardware (e.g., one or more processors, integrated circuits, memory, personal data assistant (PDA), scientific device/instrument, etc.), firmware or storage media (e.g., one or more hard disks, floppy disks, optical drives, flash memory, compact discs, digital video discs, etc.).

All of the methods disclosed and claimed herein can be made and executed without undue experimentation in light of the present disclosure. While the methods of this invention have been described in terms of preferred embodiments, it will be apparent to those of skill in the art that variations may be applied to the methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

1. Cancer Facts and Figures 2007," American Cancer Society, 2007.
2. E. J. Feuer, L. Wun, C. C. Boring et al., "The Lifetime Risk of Developing Breast Cancer," Journal of the National Cancer Institute 85 (11), 892 (1993).
3. L. Wun, R. M. Merrill, and E. J. Feuer, "Estimating Lifetime and Age-Conditional Probabilities of Developing Cancer," Lifetime Data Analysis 4, 169 (1998).
4. American College of Radiology, ACR BI-RADS—Mammography, Ultrasound & Magnetic Resonance Imaging, Fourth ed. (American College of Radiology, Reston, Va., 2003).
5. L. Liberman, A. F. Abramson, F. B. Squires et al., "The breast imaging reporting and data system: positive predictive value of mammographic features and final assessment categories," AJR. American Journal of Roentgenology. 171 (1), 35 (1998).
6. C. H. Lee, "Screening mammography: proven benefit, continued controversy," Radiologic clinics of North America 40, 395 (2002).
7. K. Kerlikowske, P. A. Carney, B. Geller et al., "Performance of screening mammography among women with and without a first-degree relative with breast cancer," Annals of Internal Medicine 133 (11), 855 (2000).
8. T. M. Kolb, J. Lichy, and J. H. Newhouse, "Comparison of the performance of screening mammography, physical examination, and breast US and evaluation of factors that influence them: an analysis of 27,825 patient evaluations. [see comment]," Radiology 225 (1), 165 (2002).
9. R. E. Bird, T. W. Wallace, and B. C. Yankaskas, "Analysis of cancers missed at screening mammography," Radiology. 184 (3), 613 (1992).
10. M. L. Giger, "Computer-aided diagnosis in radiology.," Academic Radiology 9 (1), 1 (2002).
11. M. L. Giger, N. Karssemeijer, and S. G. Armato, III, "Computer-aided diagnosis in 645 medical imaging," IEEE Transactions on Medical Imaging 20 (12), 1205 (2001).
12. M. L. Giger, "Computer-aided diagnosis of breast lesions in medical images," Computing in Science & Engineering 2 (5), 39 (2000).
13. K. Doi, H. MacMahon, S. Katsuragawa et al., "Computer-aided diagnosis in radiology: potential and pitfalls," European Journal of Radiology. 31 (2), 97 (1999).
14. C. J. Vyborny, M. L. Giger, and R. M. Nishikawa, "Computer-aided detection and diagnosis of breast cancer," Radiologic Clinics of North America 38 (4), 725 (2000).
15. M. P. Sampat, M. K. Markey, and A. C. Bovik, "Computer-aided detection and diagnosis in mammography," in Book Handbook of Image and Video Processing, edited by A. C. Bovik (Academic Press, 2005), pp. 1195.
16. L. W. Burhenne, S. A. Wood, C. J. D'Orsi et al., "Potential contribution of computer-aided detection to the sensitivity of screening mammography," Radiology 215 (2), 554 (2000).
17. T. W. Freer and M. J. Ulissey, "Screening mammography with computer-aided detection: prospective study of 12,860 patients in a community breast center," 660 Radiology. 220 (3), 781 (2001). A model-based framework for the detection of spiculated lesions on mammography, Sampat et al. 43
18. C. J. Vyborny, T. Doi, K. F. O'Shaughnessy et al., "Breast cancer: importance of spiculation in computer-aided detection," Radiology. 215 (3), 703 (2000).
19. D. Gur, J. H. Sumkin, H. E. Rockette et al., "Changes in breast cancer detection and mammography recall rates after the introduction of a computer-aided detection system. [see comment]," Journal of the National Cancer Institute 96 (3), 185 (2004).
20. M. Bazzocchi, F. Mazzarella, C. Del Frate et al., "CAD systems for mammography: a real opportunity? A review of the literature," Radiol Med (Torino) 112 (3), 329 (2007).
21. R. L. Birdwell, D. M. Ikeda, K. F. O'Shaughnessy et al., "Mammographic characteristics of 115 missed cancers later detected with screening mammography and the potential utility of computer-aided detection," Radiology 219 (1), 192 (2001).
22. S. K. Yang, W. K. Moon, N. Cho et al., "Screening Mammography-detected Cancers: Sensitivity of a Computer-aided Detection System Applied to Full-Field Digital Mammograms," Radiology 244 (1), 104 (2007).
23. R. F. Brem, J. A. Rapelyea, G. Zisman et al., "Evaluation of breast cancer with a computer-aided detection system by mammographic appearance and histopathology," Cancer 104 (5), 931 (2005).
24. W. P. Kegelmeyer, Jr., J. M. Pruneda, P. D. Bourland et al., "Computer-aided mammographic screening for spiculated lesions," Radiology 191 (2), 331 (1994).
25. N. Karssemeijer and G. M. to Brake, "Detection of stellate distortions in mammograms," Medical Imaging, IEEE Transactions on 15 (5), 611 (1996).
26. L. Sheng, C. F. Babbs, and E. J. Delp, "Multiresolution detection of speculated lesions in digital mammograms," IEEE Transactions on Image Processing 10 (6), 874 (2001).
27. M. Zhang, C. Giger, C. J. Vyborny et al., "Mammographic texture analysis for the detection of spiculated lesions.," Digital Mammography, 347 (1996).
28. R. Zwiggelaar, T. C. Parr, J. E. Schumm et al., "Model-based detection of spiculated lesions in mammograms," Medical Image Analysis 3 (1), 39 (1999).
29. M. P. Sampat, G. J. Whitman, T. W. Stephens et al., "The reliability of measuring physical characteristics of spiculated masses on mammography," British Journal of Radiology 79, S123 (2006).
30. A. Bovik, Handbook of Image & Video Processing, Second ed. (2005).
31. A. Papoulis, The Fourier Integral and Its Applications. (McGraw-Hill, 1962).
32. A. Kak and M. Slaney, Principles of computerized tomographic imaging. (IEEE 695 Press, 1998).
33. A. Averbuch, R. Coifman, D. Donoho et al., "Fast Slant Stack: A notion of Radon Transform for Data in a Cartesian Grid which is Rapidly Computible, Algebraically Exact, Geometrically Faithful and Invertible," SIAM Scientific Computing (To appear).

34. M. P. Sampat, G. J. Whitman, A. C. Bovik et al., "Comparison of algorithms to enhance spicules on spiculated lesions on mammography," Journal of Digital Imaging (In Press).

35. M. P. Sampat and A. C. Bovik, "Detection of spiculated lesions in mammograms," presented at the Proceedings of the 25th Annual International Conference of the IEEE Engineering in Medicine and Biology Society, Cancun, Mexico, 2003.

36. M. P. Sampat, G. J. Whitman, M. K. Markey et al., "Evidence-based detection of spiculated masses and architectural distortions," presented at the Medical Imaging 2005: Image Processing, San Diego, Calif., 2005.

37. A. C. Bovik, M. Clark, and W. S. Geisler, "Multichannel texture analysis using localized spatial filters," IEEE Transactions on Pattern Analysis and Machine Intelligence 12 (1), 55 (1990).

38. A. C. Bovik, "Analysis of multichannel narrow-band filters for image texture segmentation," IEEE Transactions on Signal Processing 39 (9), 2025 (1991).

39. A. C. Bovik, N. Gopal, T. Emmoth et al., "Localized measurement of emergent 715 image frequencies by Gabor wavelets," IEEE Transactions on Information Theory 38 (2), 691 (1992).

40. M. Heath, K. W. Bowyer, D. Kopans et al., "The Digital Database for Screening Mammography," presented at the 5th International Workshop on Digital Mammography, Toronto, Canada, 2000.

41. J. Suckling, J. Parker, D. Dance et al., "The mammographic images analysis society digital mammogram database," Exerpta Medica 1069, 375 (1994).

42. C. Yang, R. Duraiswami, N. A. Gumerov et al., "Improved fast gauss transform and efficient kernel density estimation," presented at the Proceedings of Ninth IEEE International Conference on Computer Vision, 2003.

43. C. Varela, N. Karssemeijer, J. H. Hendriks et al., "Use of prior mammograms in the classification of benign and malignant masses," Eur J Radiol 56 (2), 248 (2005).

44. R. Saunders, E. Samei, J. Baker et al., "Simulation of mammographic lesions," Acad Radiol 13 (7), 860 (2006).

45. R. Zwiggelaar, S. M. Astley, C. R. M. Boggis et al., "Linear structures in mammographic images: detection and classification," IEEE transactions on medical imaging. 23 (9), 1077 (2004).

46. D. Marr, Vision: A Computational Investigation into the Human Representation and Processing of Visual Information (W.H. Freeman, 1983).

47. L. Cormack, "Computational Models of Early Human Vision," in Book Handbook 735 of Image and Video Processing, edited by A. C. Bovik (Academic Press, 2005).

48. D. Dunn and W. E. Higgins, "Optimal Gabor filters for texture segmentation," Image Processing, IEEE Transactions on 4 (7), 947 (1995).

49. A. Teuner, O. Pichler, and B. J. Hosticka, "Unsupervised texture segmentation of images using tuned matched Gabor filters," Image Processing, IEEE Transactions on 740 4 (6), 863 (1995).

50. G. M. Haley and B. S. Manjunath, "Rotation-invariant texture classification using a complete space-frequency model," Image Processing, IEEE Transactions on 8 (2), 255 (1999).

51. M. Clark, A. Bovik, and S. Geisler, "Texture segmentation using gabor modulation and demodulation," pattern Recognition letters 6, 261 (1987).

52. A. K. Jain and F. Farrokhnia, "Unsupervised texture segmentation using Gabor filters," Pattern Recognition 24 (12), 1167 (1991).

53. T. P. Weldon, W. E. Higgins, and D. F. Dunn, "Efficient Gabor filter design for texture segmentation," Pattern Recognition 29 (12), 2005 (1996). A model-based framework for the detection of spiculated lesions on mammography, Sampat et al. 45

54. G. M. te Brake, N. Karssemeijer, and J. H. Hendriks, "Automated detection of breast carcinomas not detected in a screening program," Radiology 207 (2), 465 (1998).

55. K. Woods and K. W. Bowyer, "A general view of detection algorithms," Digital Mammography, 385 (1996).

56. U.S. Food and Drug Administration, "Summary of Safety and Effectiveness Data: R2 Technologies (P970058)," 1998.

57. M. D. Heath and K. W. Bowyer, "Mass Detection by Relative Image Intensity," presented at the 5th International Workshop on Digital Mammography, Toronto, Canada, 2000.

58. D. M. Catarious, Jr., A. H. Baydush, and C. E. Floyd, Jr., "Incorporation of an iterative, linear segmentation routine into a mammographic mass CAD system," Med Phys 31 (6), 1512 (2004).

59. D. M. Catarious, Jr., A. H. Baydush, and C. E. Floyd, Jr., "Characterization of difference of Gaussian filters in the detection of mammographic regions," Med Phys 765 33 (11), 4104 (2006).

60. G. M. te Brake, N. Karssemeijer, and J. H. Hendriks, "An automatic method to discriminate malignant masses from normal tissue in digital mammograms," Physics in Medicine & Biology. 45 (10), 2843 (2000).

What is claimed is:

1. A method of detecting one or more spiculated masses in an image using a processor comprising the steps of:
    receiving the image in the processor;
    filtering the received image using one or more Gaussian filters to detect one or more central mass regions;
    filtering the received image using one or more spiculated lesion filters to detect where the one or more spiculated masses converge;
    filtering the received image using one or more Difference-of-Gaussian filters to suppress one or more linear structures;
    creating an enhanced image showing the detected spiculated masses by combining an output from all of the filtering steps; and
    providing the enhanced image to an output of the processor.

2. The method as recited in claim 1, further comprising the step of applying a weight to each of the outputs from the filtering steps.

3. The method as recited in claim 1, further comprising the step of determining one or more modeling parameters based on spicule widths, spicule lengths, central mass diameter, major and minor axes of central mass regions, or number of measured spicules.

4. The method as recited in claim 1, wherein:
    the one or more spiculated lesion filters comprise at least a cosine spiculation filter and a sine spiculation filter; and
    wherein the cosine speculation filter and the sine speculation filter have the same or different σ, f and $r_0$ values.

5. The method as recited in claim 1, wherein the filtering steps are performed in parallel or sequentially.

6. The method as recited in claim 1, wherein:
    the one or more Gaussian filters comprise a set of twenty-five Gaussian filters; and the one or more Difference-of-Gaussian filters comprise a subset of six-teen Gaussian filters.

7. The method as recited in claim 1, wherein the step of filtering the received image using a spiculated lesion filter to detect where the one or more spiculated masses converge comprises the steps of:
   calculating a Radon Domain transform of the received image;
   filtering the calculated Radon Domain transform to detect one or more peaks that represent the one or more spiculated masses;
   calculating an inverse Radon Domain Transform of the filtered Radon Domain transform; and
   providing an output from the calculated inverse Radon Domain transform that shows the detected spiculated masses.

8. The method as recited in claim 7, further comprising the step of thresholding the Radon Domain transform.

9. The method as recited in claim 1, wherein:
   the processor comprises a computer, a personal data assistant, a hand-held device, a digital processor, an image processing card, an integrated circuit, scientific device/instrument or computer aided detection device;
   the image is received from a memory, a portable storage medium, a personal data assistant, a scientific device/instrument, a hard disk, a floppy disk, an optical drive, a flash memory, a compact disc, a digital video disc, a remote location via a communication link, an image scanner or a mammogram; or
   the output of the processor comprises a communications interface, a display, a printer, a memory, a portable storage medium, a personal data assistant, a scientific device/instrument, a hard disk, a floppy disk, an optical drive, a flash memory, a compact disc, a digital video disc, a remote location via a communication link, an image scanner or a mammogram.

10. A computer program embodied on a non-transitory computer readable medium that is executable by a processor for detecting one or more spiculated masses in an image comprising instructions for performing the functions of:
   receiving the image in the processor;
   filtering the received image using one or more Gaussian filters to detect one or more central mass regions;
   filtering the received image using one or more spiculated lesion filters to detect where the one or more spiculated masses converge;
   filtering the received image using one or more Difference-of-Gaussian filters to suppress one or more linear structures;
   for creating an enhanced image showing the detected spiculated masses by combining an output from all of the filtering steps; and
   for providing the enhanced image to an output of the processor.

11. The computer program as recited in claim 10, further comprising instructions for performing the function of applying a weight to each of the outputs from the filtering steps.

12. The computer program as recited in claim 10, further comprising instructions for performing the function of determining one or more modeling parameters based on spicule widths, spicule lengths, central mass diameter, major and minor axes of central mass regions, or number of measured spicules.

13. The computer program as recited in claim 10, wherein the instructions for performing the function of filtering the received image using a spiculated lesion filter to detect where the one or more spiculated masses converge comprises instructions for performing the functions of:
   calculating a Radon Domain transform of the received image;
   filtering the calculated Radon Domain transform to detect one or more peaks that represent the one or more spiculated masses;
   calculating an inverse Radon Domain Transform of the filtered Radon Domain transform; and
   providing an output from the calculated inverse Radon Domain transform that shows the detected spiculated masses.

14. An apparatus comprising:
   a processor;
   a memory communicably coupled to the processor;
   one or more communication interfaces communicably coupled to the processor; and
   wherein the processor receiving an image from the one or more communication interfaces or the memory, filters the received image using one or more Gaussian filters to detect one or more central mass regions, filters the received image using one or more spiculated lesion filters to detect where the one or more spiculated masses converge, filters the received image using one or more Difference-of-Gaussian filters to suppress one or more linear structures, creates an enhanced image showing the detected spiculated masses by combining an output from all of the filtering steps, and provides the enhanced image to the memory or the one or more communication interfaces.

15. The apparatus as recited in claim 14, wherein the processor further applies a weight to each of the outputs from the filtering steps.

16. The apparatus as recited in claim 14, wherein the processor further determines one or more modeling parameters based on spicule widths, spicule lengths, central mass diameter, major and minor axes of central mass regions, or number of measured spicules.

17. The apparatus as recited in claim 14, wherein the processor filters the received image using a spiculated lesion filter to detect where the one or more spiculated masses converge by calculating a Radon Domain transform of the received image, filtering the calculated Radon Domain transform to detect one or more peaks that represent the one or more spiculated masses, calculating an inverse Radon Domain Transform of the filtered Radon Domain transform, and providing an output from the calculated inverse Radon Domain transform that shows the detected spiculated masses.

18. The apparatus as recited in claim 14, wherein the processor further thresholds the Radon Domain transform.

19. The apparatus as recited in claim 14, wherein:
   the apparatus comprises a computer, a personal data assistant, a hand-held device, a digital processor, an image processing card, an integrated circuit, scientific device/instrument or computer aided detection device;
   the communications interface is communicably coupled to an output device, an input device, a local or wide area network or a scientific device/instrument; or
   the output device or the input device comprise a display, a printer, a memory, a portable storage medium, a personal data assistant, a hard disk, a floppy disk, an optical drive, a flash memory, a compact disc, a digital video disc, an image scanner or a mammogram.

20. The apparatus as recited in claim 14, wherein:
   the one or more spiculated lesion filters comprise at least a cosine spiculation filter and a sine spiculation filter; and
   wherein the cosine speculation filter and the sine speculation filter have the same or different σ, f and $r_0$ values.

* * * * *